United States Patent
Furukawa et al.

(10) Patent No.: US 10,559,849 B2
(45) Date of Patent: Feb. 11, 2020

(54) GLASS-CERAMIC, LITHIUM ION CONDUCTOR, BATTERY, ELECTRONIC DEVICE, AND METHOD FOR PRODUCING ELECTRODE

(71) Applicant: MURATA MANUFACTURING CO., LTD., Kyoto (JP)

(72) Inventors: Keiko Furukawa, Tokyo (JP); Tatsuya Furuya, Kanagawa (JP); Hideyuki Kumita, Kanagawa (JP); Sae Miyaji, Kanagawa (JP); Harumi Shibata, Kanagawa (JP); Masamitsu Suzuki, Kanagawa (JP); Go Sudo, Kanagawa (JP); Keisuke Shimizu, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 245 days.

(21) Appl. No.: 15/514,556

(22) PCT Filed: Nov. 9, 2015

(86) PCT No.: PCT/JP2015/005587
§ 371 (c)(1),
(2) Date: Mar. 27, 2017

(87) PCT Pub. No.: WO2016/075921
PCT Pub. Date: May 19, 2016

(65) Prior Publication Data
US 2017/0229734 A1    Aug. 10, 2017

(30) Foreign Application Priority Data

Nov. 10, 2014 (JP) ................................. 2014-228271

(51) Int. Cl.
*H01M 10/0562* (2010.01)
*C03C 3/064* (2006.01)
(Continued)

(52) U.S. Cl.
CPC ......... *H01M 10/0562* (2013.01); *C03C 3/064* (2013.01); *C03C 4/18* (2013.01);
(Continued)

(58) Field of Classification Search
CPC ...... C03C 10/00; C03C 4/18; H01M 10/0525; H01M 10/0562; H01M 2300/0071; H01M 4/131
See application file for complete search history.

(56) References Cited

U.S. PATENT DOCUMENTS

2009/0214957 A1*  8/2009  Okada ................. H01M 4/5825
                                                                    429/319

FOREIGN PATENT DOCUMENTS

CN        102426871 A      4/2012
JP        2001-250580 A    9/2001
(Continued)

OTHER PUBLICATIONS

State Intellectual Property Office for the People's Republic of China, Office Action and Search Report for Chinese Patent Application No. 201580051945.9 (related to above-captioned patent application), dated Dec. 15, 2017.
(Continued)

*Primary Examiner* — Stewart A Fraser
(74) *Attorney, Agent, or Firm* — K&L Gates LLP

(57) ABSTRACT

A glass-ceramic includes an oxide containing lithium (Li), silicon (Si), and boron (B) and has an X-ray diffraction spectrum with two or more peaks appearing in the range $20°≤2θ≤25°$ and with two or more peaks appearing in the range $25°<2θ≤30°$.

13 Claims, 23 Drawing Sheets

(51) Int. Cl.
- *C03C 4/18* (2006.01)
- *H01M 4/04* (2006.01)
- *H01B 1/08* (2006.01)
- *H01M 10/052* (2010.01)
- *C03C 10/00* (2006.01)
- *H01M 4/139* (2010.01)
- *H01M 4/62* (2006.01)
- *H01M 4/131* (2010.01)
- *H01M 4/134* (2010.01)
- *H01M 4/1391* (2010.01)
- *H01M 4/525* (2010.01)
- *H01M 4/66* (2006.01)
- *H01M 10/0525* (2010.01)
- *H01M 4/02* (2006.01)

(52) U.S. Cl.
CPC .......... *C03C 10/00* (2013.01); *C03C 10/0054* (2013.01); *H01B 1/08* (2013.01); *H01M 4/043* (2013.01); *H01M 4/0407* (2013.01); *H01M 4/0414* (2013.01); *H01M 4/0471* (2013.01); *H01M 4/131* (2013.01); *H01M 4/134* (2013.01); *H01M 4/139* (2013.01); *H01M 4/1391* (2013.01); *H01M 4/525* (2013.01); *H01M 4/62* (2013.01); *H01M 4/622* (2013.01); *H01M 4/661* (2013.01); *H01M 10/052* (2013.01); *H01M 10/0525* (2013.01); *C03C 2204/00* (2013.01); *H01M 2004/028* (2013.01); *H01M 2300/0068* (2013.01); *H01M 2300/0071* (2013.01)

(56) References Cited

FOREIGN PATENT DOCUMENTS

| | | |
|---|---|---|
| JP | 2002-109955 A | 4/2002 |
| JP | 2004-087251 A | 3/2004 |
| JP | 2006-222063 A | 8/2006 |
| JP | 2012043646 | 3/2012 |
| JP | 2013-239260 A | 11/2013 |
| JP | 2014-507053 A | 3/2014 |
| JP | 2014-089971 A | 5/2014 |
| JP | WO2014125633 | 2/2017 |
| JP | WO2014171483 | 2/2017 |

OTHER PUBLICATIONS

Japanese Office Action dated Dec. 25, 2018 in corresponding Japanese Application No. 2016-558883.

Chinese Office Action dated Nov. 9, 2018 in corresponding Chinese Application No. 201580051945.9.

Chul Eui Kim, et al., Fabrication of a high lithium ion conducting lithium borosilicate glass, Journal of Non-Crystalline Solids,357 (2011) 2863-2867.

Chinese Office Action dated Jul. 23, 2019 in corresponding Chinese Application No. 201580051945.9.

Japanese Office Action dated Aug. 20, 2019 in corresponding Japanese Application No. 2016-558883.

Kim, et al., Fabrication of a high lithium ion conducting lithium borosilicate glass, Journal of Non-Crystalline Solids, 357 (2011), 2863-2867.

International Search Report (with English translation) dated Feb. 16, 2016 in corresponding international application No. PCT/JP2015/005587 (9 pages).

Written Opinion dated Feb. 16, 2016 in corresponding international application No. PCT/JP2015/005587 (4 pages).

\* cited by examiner

FIG. 1

| peak | borate groups | structure | Wavenumber (cm⁻¹) | NBO per a boron atom | BO per a boron atom |
|---|---|---|---|---|---|
| X | Orthoborate:BO$_3^{3-}$ | | 940-930 | 3 | 0 |
| Y | Pyroborate:B$_2$O$_5^{4-}$ | | 850-820 | 2 | 1/2 |

*NBO: nonbridging oxygen
BO: bridging oxygen

A

B

A

B

A

B

C

A

B

GLASS-CERAMIC, LITHIUM ION CONDUCTOR, BATTERY, ELECTRONIC DEVICE, AND METHOD FOR PRODUCING ELECTRODE

CROSS-REFERENCE TO RELATED APPLICATIONS

The present application claims the benefit of International Application No. PCT/JP2015/005587, filed Nov. 9, 2015, which claims priority to Japanese Application No. 2014-228271, filed Nov. 10, 2014, the disclosures of which are incorporated herein by reference.

BACKGROUND

The present technology relates to a glass-ceramic, a lithium ion conductor, a battery, an electronic device, and a method for producing an electrode.

In recent years, the demand for batteries has been rapidly increasing with the development of portable devices such as personal computers (PCs) and cellular phones. In addition, as the widespread use of electric vehicles and so on has also been accelerated, the needs for batteries have been increasing more and more. There are various types of batteries, such as rechargeable secondary batteries including lithium-ion batteries and non-rechargeable primary batteries, but such batteries all contain an electrolytic solution. Such batteries might cause electronic devices to fail, for example, due to leakage of the electrolytic solution. In particular, lithium-ion secondary batteries might also cause thermal runaway due to short-circuit.

In order to solve such problems, all-solid-state batteries have been developed, in which solid electrolytes are used instead of liquid electrolytes. All-solid-state batteries using solid electrolytes have no risk of liquid leakage or thermal runaway and are less sensitive to the problem of battery performance degradation caused by, for example, corrosion. In addition, some solid electrolyte materials have a potential window wider than that of electrolytic solutions, and thus can be expected to form high energy density batteries.

In recent years, there has been a demand for solid electrolytes having high lithium ion conductivity. To meet such a demand, Patent Documents 1 and 2 propose $Li_2S$—$P_2S_5$ based lithium ion conducting ceramics.

CITATION LIST

Patent Document

Patent Document 1: Japanese Patent Application Laid-Open No. 2001-250580
Patent Document 2: Japanese Patent Application Laid-Open No. 2002-109955

SUMMARY

Problems to be Solved by the Invention

It is an object of the present technology to provide a highly ion-conductive glass-ceramic, a lithium ion conductor, a battery, an electronic device, and a method for producing an electrode.

Solutions to Problems

To solve the above problems, a first aspect of the present technology is directed to a glass-ceramic including an oxide containing lithium (Li), silicon (Si), and boron (B), the glass-ceramic having an X-ray diffraction spectrum with two or more peaks appearing in the range $20°\leq2\theta\leq25°$ and with two or more peaks appearing in the range $25°<2\theta\leq30°$.

A second aspect of the present technology is directed to a battery including a positive electrode, a negative electrode, and an electrolyte layer, wherein at least one of the positive electrode, the negative electrode, and the electrolyte layer contains a glass-ceramic having an X-ray diffraction spectrum with two or more peaks appearing in the range $20°\leq2\theta\leq25°$ and with two or more peaks appearing in the range $25°<2\theta\leq30°$.

A third aspect of the present technology is directed to an electronic device having a battery including a positive electrode, a negative electrode, and an electrolyte layer and being configured to receive power supply from the battery, wherein at least one of the positive electrode, the negative electrode, and the electrolyte layer contains a glass-ceramic having an X-ray diffraction spectrum with two or more peaks appearing in the range $20°\leq2\theta\leq25°$ and with two or more peaks appearing in the range $25°<2\theta\leq30°$.

A fourth aspect of the present technology is directed to a lithium ion conductor including an oxide containing lithium (Li), silicon (Si), and boron (B), the lithium ion conductor having an X-ray diffraction spectrum with two or more peaks appearing in the range $20°\leq2\theta\leq25°$ and with two or more peaks appearing in the range $25°<2\theta\leq30°$.

A fifth aspect of the present technology is directed to a lithium ion conductor including an oxide containing lithium (Li), silicon (Si), and boron (B), the lithium ion conductor having an X-ray diffraction spectrum with a peak A appearing in the range $25°\leq2\theta\leq26°$ and with a peak B appearing in the range $41°\leq2\theta\leq42°$.

A sixth aspect of the present technology is directed to a battery including a positive electrode, a negative electrode, and an electrolyte layer, wherein at least one of the positive electrode, the negative electrode, and the electrolyte layer contains a lithium ion conductor having an X-ray diffraction spectrum with a peak A appearing in the range $25°\leq2\theta\leq26°$ and with a peak B appearing in the range $41°\leq2\theta\leq42°$.

A seventh aspect of the present technology is directed to an electronic device having a battery including a positive electrode, a negative electrode, and an electrolyte layer and being configured to receive power supply from the battery, wherein at least one of the positive electrode, the negative electrode, and the electrolyte layer contains a lithium ion conductor having an X-ray diffraction spectrum with a peak A appearing in the range $25°\leq2\theta\leq26°$ and with a peak B appearing in the range $41°\leq2\theta\leq42°$.

An eighth aspect of the present technology is directed to a method for producing an electrode, the method including firing an electrode including an active material and a lithium ion conductor while pressurizing the electrode.

Effects of the Invention

As described above, the present technology makes it possible to provide glass-ceramics having high ionic conductivity.

BRIEF DESCRIPTION OF DRAWINGS

FIG. 1 is a diagram for illustrating assignment of peaks X and Y of the Raman spectrum of a glass-ceramic according to a first embodiment of the present technology.

DETAILED DESCRIPTION

Figure 2:
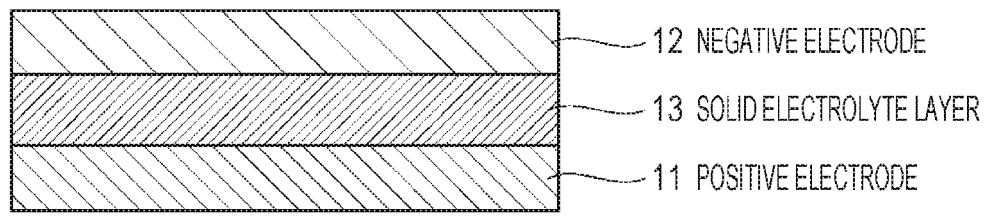
FIG. 2 is a cross-sectional view illustrating an example of the configuration of a battery according to a second embodiment of the present technology.

With reference to the drawings, embodiments of the present technology will be described in the order shown below. Note that in all the drawings for the embodiments described below, the same or corresponding components are denoted by the same reference signs.
1. First embodiment (example of glass-ceramic)
   1.1 Configurations of glass-ceramic
   1.2 Method for producing glass-ceramic
   1.3 Advantageous effect
2. Second embodiment (example of battery)
   2.1 Configurations of battery
   2.2 Method for producing battery
   2.3 Advantageous effects
   2.4 Modifications
3. Third embodiment (example of glass-ceramic)
   3.1 Configurations of glass-ceramic
   3.2 Method for producing glass-ceramic
   3.3 Advantageous effects
4. Fourth embodiment (example of battery)
   4.1 Configurations of battery
   4.2 Method for producing battery
   4.3 Advantageous effects
   4.4 Modifications
5. Fifth embodiment (example of electronic device)
   5.1 Configurations of electronic device
   5.2 Modifications <1 First Embodiment>

[1.1 Configurations of Glass-Ceramic]

A glass-ceramic according to a first embodiment is a lithium ion-conducting oxide crystallized glass (lithium ion conductor) containing lithium (Li), silicon (Si), and boron (B) and having mixed amorphous and crystalline phases. The glass-ceramic is suitable for use as a material for batteries such as all-solid-state batteries and specifically suitable for use as a solid electrolyte, a binding agent, or a coating agent.

The glass-ceramic includes an oxide containing lithium (Li), silicon (Si), and boron (B). More specifically, the glass-ceramic includes $Li_2O$, $SiO_2$, and $B_2O_3$. The $Li_2O$ content is preferably from 40 mol % to 73 mol % based on the total amount of $Li_2O$, $SiO_2$, and $B_2O_3$. The $SiO_2$ content is preferably from 8 mol % to 40 mol % based on the total amount of $Li_2O$, $SiO_2$, and $B_2O_3$. The $B_2O_3$ content is preferably from 10 mol % to 50 mol % based on the total amount of $Li_2O$, $SiO_2$, and $B_2O_3$. Note that these contents can be measured using, for example, inductively coupled plasma atomic emission spectroscopy (ICP-AES).
(X-Ray Diffraction Spectrum)

The glass-ceramic is in the form of, for example, a powder. The glass-ceramic has an X-ray diffraction spectrum with two or more peaks appearing in the range $20 \le 2\theta \le 25°$ and with two or more peaks appearing in the range $25° < 2\theta \le 30°$. The glass-ceramic can have higher ionic conductivity because it contains a crystal having such peaks.

The number of peaks detected in the ranges $20 \le 2\theta \le 25°$ and $25° < 2\theta \le 30°$ tends to decrease with increasing amount of $Li_2O$ added as a raw material for the glass-ceramic. In view of this point, the glass-ceramic preferably has two or more peaks in the range $20 \le 2\theta \le 25°$ and two or more peaks in the range $25° < 2\theta \le 30°$ when having a $Li_2O$ content in the range of more than 70 mol % to 73 mol %. When having a $Li_2O$ content in the range of 40 mol % to 70 mol %, the glass-ceramic preferably has four or more peaks in the range $20 \le 2\theta \le 25°$ and four or more peaks in the range $25° < 2\theta \le 30°$. In this context, the $Li_2O$ content refers to the content of $Li_2O$ based on the total amount of $Li_2O$, $SiO_2$, and $B_2O_3$ as raw materials for the glass-ceramic.

If necessary, the glass-ceramic may further contain an additive element. The additive element may be, for example, one or more selected from the group consisting of sodium (Na), magnesium (Mg), aluminum (Al), phosphorus (P), potassium (K), calcium (Ca), titanium (Ti), vanadium (V), chromium (Cr), manganese (Mn), iron (Fe), cobalt (Co), nickel (Ni), copper (Cu), zinc (Zn), gallium (Ga), germanium (Ge), selenium (Se), rubidium (Rb), sulfur (S), yttrium (Y), zirconium (Zr), niobium (Nb), molybdenum (Mo), silver (Ag), indium (In), tin (Sn), antimony (Sb), cesium (Cs), barium (Ba), hafnium (Hf), tantalum (Ta), tungsten (W), lead (Pb), bismuth (Bi), gold (Au), lanthanum (La), neodymium (Nd), and europium (Eu).
(Raman Spectrum)

When containing 69 mol % or more of $Li_2O$, the glass-ceramic should preferably have a Raman spectrum with the following features. Specifically, the Raman spectrum of the glass-ceramic preferably has a Raman shift peak X appearing in the region of 920 $cm^{-1}$ to 940 $cm^{-1}$ and a Raman shift peak Y appearing in the region of 820 $cm^{-1}$ to 850 $cm^{-1}$ and also preferably has a ratio X/Y of the area intensity of the peak X to the area intensity of the peak Y of 2.0 or more. When having a peak area intensity ratio X/Y of 2.0 or more in this way, the glass-ceramic can have further improved ionic conductivity.

As shown in FIG. 1, the peaks X and Y of the Raman spectrum belong to $BO_3^{3-}$ and $B_2O_5^{4-}$ structures, respectively. The glass-ceramic contains $BO_3$ and $B_2O_5$ as oxides of boron (B). The contents of $BO_3$ and $B_2O_5$ are preferably so selected that the peak area intensity ratio X/Y is 2.0 or more.

In addition, when containing 50 mol % to less than 69 mol % of $Li_2O$, the glass-ceramic should preferably have a Raman spectrum with the following features. In the Raman spectrum of the glass-ceramic, the main peak among peaks appearing in the Raman shift region of 500 $cm^{-1}$ to 1,000 $cm^{-1}$ preferably has a full width at half maximum of 20 or more, more preferably 20 to 40. When the main peak has a full width at half maximum of 20 or more in this way, the glass-ceramic can have further improved ionic conductivity.

As used herein, the term "main peak" means the peak with the highest intensity among peaks appearing in the Raman shift region of 500 $cm^{-1}$ to 1,000 $cm^{-1}$.
(NMR Method)

The glass-ceramic preferably has a $^7Li$ nuclear spin-lattice relaxation time (T1) of 6 seconds or less, more preferably 5 seconds or less, even more preferably 3 seconds or less, as measured by solid-state high-resolution nuclear magnetic resonance (NMR) method. When having a $^7Li$ nuclear spin-lattice relaxation time (T1) of 6 seconds or less, the glass-ceramic can have further improved ionic conductivity.

The $^7Li$ nuclear spin-lattice relaxation time (T1) measured by NMR method depends on the lattice vibration (local motion state) of Li ions in the glass-ceramic. In other words, as the mobility of Li ions increases, the glass-ceramic would become more likely to release the absorbed radio wave energy in the form of heat, so that the spin-lattice relaxation time (T1) would be short. On the other hand, as the lattice vibration of Li ions increases, the activation energy necessary for ion diffusion would become easier to obtain. Therefore, this means that as the glass-ceramic decreases in $^7Li$ nuclear spin-lattice relaxation time (T1), ion diffusion becomes more likely to occur, so that the glass-ceramic would have improved conductivity. For example, there is a linear correlation between the spin-lattice relaxation time (T1) and the conductivity.
[1-2 Method for Producing Glass-Ceramic]

Hereinafter, a description will be given of an example of a method for producing the glass-ceramic according to the first embodiment of the present technology.

First, a plurality of amorphous materials is mixed as raw materials. The amorphous materials used include a network-forming oxide, a modifying oxide, and optionally an intermediate oxide. $SiO_2$ and $B_2O_3$ are used as network-forming oxides. $Li_2O$ is used as a modifying oxide. For example, an oxide of at least one selected from the group consisting of Na, Mg, Al, P, K, Ca, Ti, V, Cr, Mn, Fe, Co, Ni, Cu, Zn, Ga, Ge, Se, Rb, S, Y, Zr, Nb, Mo, Ag, In, Sn, Sb, Cs, Ba, Hf, Ta, W, Pb, Bi, Au, La, Nd, and Eu is used as an intermediate oxide.

The content of $Li_2O$ is preferably from 40 mol % to 73 mol % based on the total amount of $Li_2O$, $SiO_2$, and $B_2O_3$. The content of $Si_2O$ is preferably from 8 mol % to 40 mol % based on the total amount of $Li_2O$, $SiO_2$, and $B_2O_3$. The content of $B_2O_3$ is preferably from 10 mol % to 50 mol % based on the total amount of $Li_2O$, $SiO_2$, and $B_2O_3$.

When the amorphous materials used include an intermediate oxide, the content of the intermediate oxide is preferably 10 mol % or less based on the total amount of the network-forming, modifying, and intermediate oxides.

In general, the amorphous materials include a network-forming oxide (network former (NWF)), a modifying oxide (network modifier), and an intermediate oxide (intermediate). The network-forming oxide (network former (NWF)) is a material capable of forming a glass by itself, such as $SiO_2$, $B_2O_3$, $P_2O_5$, or $GeO_2$. The modifying oxide (network modifier) is a material that is not capable of causing amorphization by itself but capable of contributing to amorphization in the network structure formed by the network-forming oxide, in other words, capable of modifying the network. The modifying oxide, which contains, for example, an alkali metal or an alkaline earth metal, is known to be effective in breaking the network structure of glass and thus in improving its flowability. The intermediate oxide (intermediate) is a raw material having intermediate properties between those of the network-forming oxide and the modifying oxide. The intermediate oxide (intermediate) is effective in, for example, lowering the thermal expansion coefficient of glass among the thermal characteristics of glass.

Subsequently, a glass-ceramic precursor (glass) is formed by turning the raw materials into glass. The method for turning the raw materials into glass may be, for example, a method including melting the raw materials to form a melt and then allowing the melt to cool, a method of pressing the melt with a metal plate or other means, a method of casting into liquid mercury, a strip furnace method, a splat quenching method, a roll method (single or twin), or any other method, such as a mechanical milling method, a sol-gel method, a vapor deposition method, a sputtering method, a laser ablation method, a pulse laser deposition (PLD) method, or a plasma method.

Subsequently, the glass-ceramic precursor is annealed to forma glass-ceramic. Subsequently, the glass-ceramic is powdered as needed. The method for forming the powder may be, for example, a mechanochemical method.

[1.3 Advantageous Effects]

The glass-ceramic according to the first embodiment has good ionic conductivity because it contains a crystal having two or more peaks appearing in the range $20°≤2θ≤25°$ and two or more peaks appearing in the range $25°<2θ≤30°$ as measured by X-ray diffraction.

<2. Second Embodiment>

A second embodiment shows a battery containing, as a solid electrolyte, the glass-ceramic according to the first embodiment described above.

[2.1 Configurations of Battery]

FIG. 2 is a cross-sectional view illustrating an example of the configuration of a battery according to a second embodiment of the present technology. As illustrated in FIG. 2, the battery includes a positive electrode 11, a negative electrode 12, and a solid electrolyte layer 13, in which the solid electrolyte layer 13 is disposed between the positive electrode 11 and the negative electrode 12. The battery is what is called an all-solid-state battery. The battery is also a secondary battery whose capacity is repeatedly available through absorption and release of lithium (Li) as an electrode reactive material. Specifically, the battery to be described herein may be a lithium-ion secondary battery whose negative electrode capacity is available through absorption and release of lithium ions or may be a lithium-metal secondary battery whose negative electrode capacity is available through precipitation and dissolution of lithium metal.

(Positive Electrode)

The positive electrode 11 is a positive electrode active material layer including one or two or more positive electrode active materials and a solid electrolyte. If necessary, the positive electrode 11 may further contain additives such as a binding agent and a conductive agent.

The positive electrode active material includes a positive electrode material capable of absorbing and releasing lithium ions as electrode reactive materials. In view of the availability of high energy density, the positive electrode material is preferably, but not limited to, a lithium-containing compound. The lithium-containing compound may be, for example, a complex oxide containing lithium and a transition metal element as constituent elements (lithium transition metal complex oxide) or a phosphate compound containing lithium and a transition metal element as constituent elements (lithium transition metal phosphate compound). In particular, the transition metal element is preferably one or two or more of cobalt (Co), nickel (Ni), manganese (Mn), and iron (Fe). This is because higher voltage can be obtained in such a case.

The lithium transition metal complex oxide is represented by, for example, the chemical formula: $Li_xM1O_2$ or $Li_yM2O_4$, and the lithium transition metal phosphate compound is represented by, for example, the chemical formula: $Li_zM3PO_4$. In the formulae, M1, M2, and M3 are each one or two or more transition metal elements, and x, y, and z are any values.

The lithium transition metal complex oxide is, for example, $LiCoO_2$, $LiNiO_2$, $LiVO_2$, $LiCrO_2$, or $LiMn_2O_4$. The lithium transition metal phosphate compound is, for example, $LiFePO_4$ or $LiCoPO_4$.

Besides the above, the positive electrode active material may be, for example, an oxide, a disulfide, a chalcogenide, or a conductive polymer. The oxide is, for example, titanium oxide, vanadium oxide, or manganese dioxide. The disulfide is, for example, titanium disulfide or molybdenum sulfide. The chalcogenide is, for example, niobium selenide. The conductive polymer is, for example, sulfur, polyaniline, or polythiophene.

The positive electrode active material includes a powder of positive electrode active material particles. The surface of the positive electrode active material particles may also be coated with a coating agent. In this case, as a non-limiting example, the coating may be provided over the entire surface of the positive electrode active material particles or may be provided on a part of the surface of the positive electrode active material particles. The coating agent is, for example, at least one of a solid electrolyte and a conductive agent. The coating agent on the surface of the positive electrode active material particles can reduce the interface resistance between the positive electrode active material and the solid electrolyte. The coating agent can also suppress the collapse of the structure of the positive electrode active material, which can widen the sweep potential range to increase the amount of lithium available for the reaction and can also improve the cycle characteristics.

The solid electrolyte used is the glass-ceramic according to the first embodiment described above.

The binding agent is, for example, one or two or more of a synthetic rubber, a polymer material, or other materials. The synthetic rubber is, for example, styrene butadiene rubber, fluororubber, or ethylene propylene diene rubber. The polymer material is, for example, polyvinylidene fluoride or polyimide. The binding agent is used to bind particles of the positive electrode active material or other materials. When the positive electrode 11 contains the solid electrolyte, the positive electrode 11 does not have to contain the binding agent. This is because the solid electrolyte can function like a binding agent when heated, for example, at a temperature equal to or higher than its glass transition temperature Tg or at a temperature equal to or higher than the temperature at which the solid electrolyte can be sintered.

The conductive agent includes, for example, one or two or more of a carbon material, a metal, a metal oxide, or a conductive polymer. The carbon material is, for example, graphite, carbon black, acetylene black, ketjen black, or carbon fibers. The metal oxide is, for example, $SnO_2$. Note that the conductive agent is not limited to the examples listed above and may be any material having electrical conductivity.

(Negative Electrode)

The negative electrode 12 is a negative electrode active material layer including one or two or more negative electrode active materials and a solid electrolyte. If necessary, the negative electrode 12 may further contain additives such as a binding agent and a conductive agent.

The negative electrode active material includes a negative electrode material capable of absorbing and releasing lithium ions as electrode reactive materials. In view of the availability of high energy density, the negative electrode material is preferably, but not limited to, a carbon material or a metallic material.

The carbon material is, for example, graphitizable carbon, non-graphitizable carbon, graphite, mesocarbon microbeads (MCMB), or highly oriented graphite (HOPG).

The metallic material is, for example, a material containing, as a constituent element, a metal or semimetal element capable of forming an alloy with lithium. More specifically, the metallic material is, for example, one or two or more of a simple substance, an alloy, or a compound of silicon (Si), tin (Sn), aluminum (Al), indium (In), magnesium (Mg), boron (B), gallium (Ga), germanium (Ge), lead (Pb), bismuth (Bi), cadmium (Cd), silver (Ag), zinc (Zn), hafnium (Hf), zirconium (Zr), yttrium (Y), palladium (Pd), or platinum (Pt). In this regard, the simple substance is not limited to a substance with a purity of 100% and may contain a small amount of impurities. The metallic material is, for example, Si, Sn, $SiB_4$, $TiSi_2$, SiC, $Si_3N_4$, $SiO_v$ ($0<v\le2$), LiSiO, $SnO_w$ ($0<w\le2$), $SnSiO_3$, LiSnO, or $Mg_2Sn$.

Besides the above, the metallic material may also be a lithium-containing compound or lithium metal (a simple substance of lithium). The lithium-containing compound is a complex oxide containing, as constituent elements, lithium and a transition metal element (lithium transition metal complex oxide), such as $Li_4Ti_5O_{12}$.

The negative electrode active material includes a powder of negative electrode active material particles. The surface of the negative electrode active material particles may also be coated with a coating agent. In this case, as a non-limiting example, the coating may be provided over the entire surface of the negative electrode active material particles or may be provided on a part of the surface of the negative electrode active material particles. The coating agent is, for example, at least one of a solid electrolyte and a conductive agent. The coating agent on the surface of the negative electrode active material particles can reduce the interface resistance between the negative electrode active material and the solid electrolyte. The coating agent can also suppress the collapse of the structure of the negative electrode active material, which can widen the sweep potential range to increase the amount of lithium available for the reaction and can also improve the cycle characteristics.

The solid electrolyte used is the glass-ceramic according to the first embodiment described above.

The binding agent is similar to the biding agent for the positive electrode 11 described above.

The conductive agent is similar to the conductive agent for the positive electrode 11 described above.

(Solid Electrolyte Layer)

The solid electrolyte layer 13 includes the glass-ceramic according to the first embodiment described above.

(Battery Operation)

In the battery, for example, lithium ions are released from the positive electrode 11 and then incorporated into the negative electrode 12 via the solid electrolyte layer 13 during charging, whereas lithium ions are released from the negative electrode 12 and then incorporated into the positive electrode 11 via the solid electrolyte layer 13 during discharging.

[2.2 Method for Producing Battery]

Next, a description will be given of an example of a method for producing the battery according to the second embodiment of the present technology. The production method includes the steps of: forming a positive electrode precursor, a negative electrode precursor, and a solid electrolyte layer precursor using a coating method; and stacking these precursors and heat-treating the stack.

(Step of Forming Positive Electrode Precursor)

The positive electrode precursor is formed as follows. First, a positive electrode slurry in the form of a paste is prepared by mixing a positive electrode active material and a solid electrolyte precursor and optionally a binding agent and a conductive agent to form a positive electrode mixture and then dispersing the positive electrode mixture in an organic solvent or the like. In this step, the solid electrolyte precursor is a precursor of the glass-ceramic according to the first embodiment described above. Subsequently, the positive electrode slurry is applied to one surface of a supporting substrate and then dried to form a positive electrode precursor, and then the positive electrode precursor is separated from the supporting substrate. The supporting substrate is, for example, a film of a polymer material such as polyethylene terephthalate (PET).

(Step of Forming Negative Electrode Precursor)

The negative electrode precursor is formed as follows. First, a negative electrode slurry in the form of a paste is prepared by mixing a negative electrode active material and a solid electrolyte precursor and optionally a binding agent and a conductive agent to form a negative electrode mixture and then dispersing the negative electrode mixture in an organic solvent or the like. In this step, the solid electrolyte precursor is a precursor of the glass-ceramic according to the first embodiment described above. Subsequently, the negative electrode slurry is applied to one surface of a supporting substrate and then dried to form a negative electrode precursor, and then the negative electrode precursor is separated from the supporting substrate.

(Step of Forming Solid Electrolyte Layer Precursor)

The solid electrolyte layer precursor is formed as follows. First, an electrolyte slurry in the form of a paste is prepared by mixing a solid electrolyte precursor and optionally a binding agent to form an electrolyte mixture and then dispersing the electrolyte mixture in an organic solvent or the like. In this step, the solid electrolyte precursor is a precursor of the glass-ceramic according to the first embodiment described above. Subsequently, the electrolyte slurry is applied to one surface of a supporting substrate and then dried to form a solid electrolyte layer precursor, and then the solid electrolyte layer precursor is separated from the supporting substrate.

At least one or all of the positive electrode precursor, the negative electrode precursor, and the solid electrolyte layer precursor may also be green sheets.

[Step of Stacking the Precursors and Firing the Stack]

A battery is produced as follows using the positive electrode precursor, the negative electrode precursor, and the solid electrolyte layer precursor obtained as described above. First, the positive electrode precursor and the negative electrode precursor are stacked with the solid electrolyte layer precursor sandwiched between them. Subsequently, the stack of the positive electrode precursor, the solid electrolyte layer precursor, and the negative electrode precursor is heat-treated. Thus, the solid electrolyte precursor in each of the positive electrode precursor, the negative electrode precursor, and the solid electrolyte precursor is converted into a glass-ceramic as a solid electrolyte. The heat treatment is also preferably performed to sinter the glass-ceramic. As a result, the desired battery is obtained.

[2.3 Advantageous Effects]

The battery according to the second embodiment of the present technology, which includes the positive electrode 11, the negative electrode 12, and the solid electrolyte layer 13 each containing the solid electrolyte according to the first embodiment described above, can have good charge-discharge characteristics, good cycle characteristics, and good other characteristics.

[2.4 Modifications]

Figure 3:
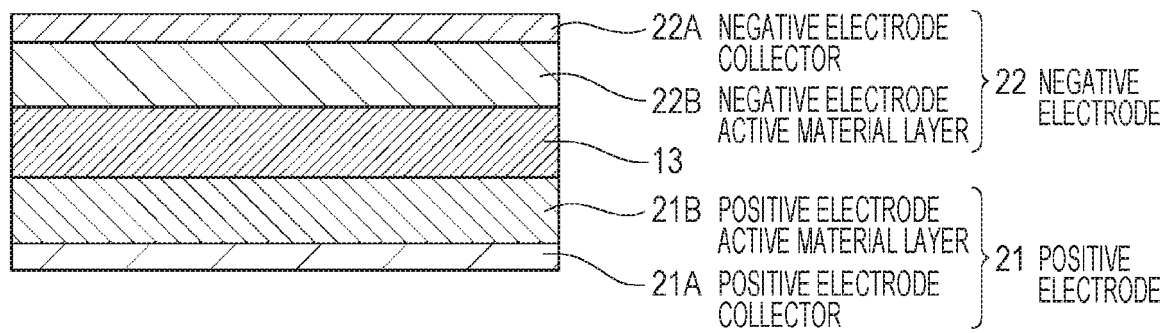
FIG. 3 is a cross-sectional view illustrating an example of the configuration of a battery according to a modification of the second embodiment of the present technology.

The second embodiment described above shows an example where the positive electrode and the negative electrode are composed of a positive electrode active material layer and a negative electrode active material layer, respectively. The composition of the positive electrode and the negative electrode is not limited to such a composition. Alternatively, for example, as shown in FIG. 3, the positive electrode 21 may include a positive electrode collector 21A and a positive electrode active material layer 21B provided on one surface of the positive electrode collector 21A. The negative electrode 22 may also include a negative electrode collector 22A and a negative electrode active material layer 22B provided on one surface of the negative electrode collector 22A.

The positive electrode collector 21A includes, for example, a metal such as aluminum (Al), nickel (Ni), or stainless steel. The positive electrode collector 21A is in the form of, for example, a foil, a sheet, or a mesh. The positive electrode active material layer 21B is similar to the positive electrode (positive electrode active material layer) 11 in the second embodiment.

The negative electrode collector 22A includes, for example, a metal such as copper (Cu) or stainless steel. The negative electrode collector 22A is in the form of, for example, a foil, a sheet, or a mesh. The negative electrode active material layer 22B is similar to the negative electrode (negative electrode active material layer) 12 in the second embodiment.

Alternatively, one of the positive and negative electrodes may include a collector and an active material layer, and the other may include only an active material layer.

The first embodiment described above shows an example where the present technology is applied to a battery using lithium as an electrode reactive material. It will be understood that such an example is not intended to limit the present technology. The present technology may also be applied to a battery using, as an electrode reactive material, any other metal such as any other alkali metal such as sodium (Na) or potassium (K), an alkaline earth metal such as magnesium (Mg) or calcium (Mg), aluminum (Al), or silver (Ag).

The second embodiment described above shows an example where the positive electrode precursor, the negative electrode precursor, and the solid electrolyte layer precursor are formed by a coating method. Alternatively, these layers may be formed by a method other than the coating method. A method that may be used as an alternative to the coating method includes compression-molding a powder of an electrode mixture including an active material and a solid electrolyte precursor using a press or compression-molding a powder of a solid electrolyte using a press. After the compression-molding, the precursor may have any shape, such as a pellet shape (coin shape). In addition, when the configuration to be used is such that one of the positive and negative electrodes contains a solid electrolyte while the other contains no solid electrolyte, the electrode containing no solid electrolyte may be produced by a vapor-phase growth method such as vapor deposition or sputtering or other non-coating methods. However, the use of coating methods is preferred, which makes possible easy production in a room temperature environment.

The second embodiment described above shows an example where the positive electrode precursor, the negative electrode precursor, and the solid electrolyte layer precursor are stacked and then heat-treated. It will be understood that this example is not intended to limit the present technology. Alternatively, for example, the positive electrode precursor and the solid electrolyte layer precursor may be stacked and then heat-treated. In this case, the negative electrode precursor not having undergone any heat treatment may be placed on the heat-treated positive electrode precursor (positive electrode 11) and solid electrolyte layer precursor (solid electrolyte layer 13) and then heat-treated. Alternatively, a heat-treated negative electrode precursor (negative electrode 12) may be prepared separately, and the heat-treated positive electrode precursor and solid electrolyte layer precursor may be bonded to the heat-treated negative electrode precursor by pressure bonding or other methods. Similarly, the negative electrode precursor and the solid electrolyte layer precursor may be stacked and then heat-treated, which may be followed by placing, on them, the positive electrode precursor not having undergone any heat treatment and then heat-treating it or followed by bonding a heat-treated positive electrode precursor (positive electrode 11) to them by pressure bonding or other methods.

In this regard, the interface resistance at or near the interface between the solid electrolyte layer precursor and the positive and negative electrode precursors should be prevented from increasing. For this purpose, the heat treatment is preferably performed after the stacking of the positive electrode precursor, the negative electrode precursor, and the solid electrolyte layer precursor.

The second embodiment described above shows an example of a configuration where the positive electrode, the negative electrode, and the solid electrolyte layer all contain the glass-ceramic of the first embodiment as a solid electrolyte. It will be understood that this configuration is not intended to limit the present technology. Alternatively, for example, at least one of the positive electrode, the negative electrode, and the solid electrolyte layer may contain the glass-ceramic of the first embodiment as a solid electrolyte while the others may contain a solid electrolyte material other than the glass-ceramic of the first embodiment.

The solid electrolyte other than the glass-ceramic of the first embodiment may be, for example, one or two or more crystalline solid electrolytes. The crystalline solid electrolyte may be of any type that is crystalline and capable of conducting lithium ions. The crystalline solid electrolyte may be, for example, an inorganic material or a polymer material. The inorganic material may be, for example, a sulfide such as $Li_2S$—$P_2S_5$, $Li_2S$—$SiS_2$—$Li_3PO_4$, $Li_7P_3S_{11}$ $Li_{3.25}Ge_{0.25}P_{0.75}S$, or $Li_{10}GeP_2S_{12}$ or an oxide such as $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, or $La_{2/3-x}Li_{3x}TiO_3$. The polymer material may be, for example, polyethylene oxide (PEO).

The second embodiment described above shows an example of a configuration where the positive electrode, the negative electrode, and the solid electrolyte layer all contain a solid electrolyte. Another configuration may also be used in which at least one of the positive and negative electrodes contains no solid electrolyte.

The second embodiment described above shows an example of a battery producing method in which a solid electrolyte precursor is used as a raw material for the positive electrode, the negative electrode, and the solid electrolyte, and a solid electrolyte in the form of a glass-ceramic is obtained by heat-treating the positive electrode precursor, the negative electrode precursor, and the solid electrolyte layer precursor. It will be understood that this example is not intended to limit the present technology. Alternatively, for example, a solid electrolyte in the form of a glass-ceramic may be used instead of the solid electrolyte precursor, as a raw material for the positive electrode, the negative electrode, and the solid electrolyte.

The second electrode described above shows an example where the glass-ceramic according to the first embodiment is used as a solid electrolyte. The glass-ceramic according to the first embodiment may also be used as a battery component other than the solid electrolyte.

For example, the glass-ceramic according to the first embodiment may also be used as a surface modifier for modifying the surface of electrode active material particles. This can suppress the reaction between an electrolytic solution and an electrode active material. For example, when used as a surface modifier on positive electrode active material particles such as $LiCoO_2$ (LCO) or $Li[NiMnCo]O_2$ (NCM) particles, the glass-ceramic according to the first embodiment can suppress the release of oxygen from the positive electrode active material particles.

Additionally, in a sulfur-based all-solid-state battery, the glass-ceramic according to the first embodiment may be used as a surface modifier on electrode active material particles to suppress the reaction between the electrode active material and the sulfur-based solid electrolyte.

The glass-ceramic according to the first embodiment may also be added to a separator or used to modify the surface of a separator. This can improve battery safety.

<3. Third Embodiment>

[3.1 Configurations of Glass-Ceramic]

A glass-ceramic according to a third embodiment is what is called a lithium ion conductor. The glass-ceramic according to the third embodiment includes an oxide containing lithium (Li), silicon (Si), and boron (B) and has an X-ray diffraction spectrum with a peak A (a first peak) appearing in the range $25°≤2θ≤26°$ and with a peak B (a second peak) appearing in the range $41°≤2θ≤42°$.

The ratio A/B of the intensity of the peak A to the intensity of the peak B is preferably from 0.5 to 2. When having a peak intensity ratio A/B in this range, the glass-ceramic can have high ionic conductivity.

The glass-ceramic according to the third embodiment may be in the form of a powder or in the form of a layer of collected particles.

The composition (material) of the glass-ceramic according to the third embodiment is similar to that of the glass-ceramic according to the first embodiment. If necessary, the glass-ceramic according to the third embodiment may further contain an additive element. Examples of the additive element may include those for the glass-ceramic according to the first embodiment.

[3.2 Method for Producing Glass-Ceramic]

Hereinafter, a description will be given of an example of a method for producing the glass-ceramic according to the third embodiment of the present technology.

First, a glass-ceramic is prepared similarly to the first embodiment and then powdered. Subsequently, the glass-ceramic powder is compressed and fired by, for example, hot pressing. This process changes the crystal structure of the glass-ceramic and creates the glass-ceramic having the peaks A and B mentioned above. As a result, a solid electrolyte layer is formed with a predetermined shape.

The pressure for the compression and firing is preferably from 1 $N/mm^2$ to 100 $N/mm^2$, more preferably from 10 $N/mm^2$ to 50 $N/mm^2$. If the pressure is less than 1 $N/mm^2$, it may be difficult to obtain the glass-ceramic with a peak A appearing in the range $25°≤2θ≤26°$ and with a peak B appearing in the range $41°≤2θ≤42°$. On the other hand, a pressure of 100 $N/mm^2$ or less can be easily obtained in a common pressing apparatus. In addition, if the pressure exceeds 100 $N/mm^2$, the time required to reach the target pressure value will be long, which may cause a decrease in productivity. In this context, the pressure for the compression and firing means the pressure applied to the surface of the glass-ceramic particles aggregate as a solid electrolyte layer precursor.

The temperature for the compression and firing is preferably from 350° C. to 500° C., more preferably from 400° C. to 450° C. If the temperature is less than 350° C., it may be difficult to obtain the glass-ceramic with a peak A appearing in the range $25°≤2θ≤26°$ and with a peak B appearing in the range $41°≤2θ≤42°$. On the other hand, at a temperature of 500° C. or less, the advantages described below will be obtained when the glass-ceramic according to the third embodiment is used for batteries. Specifically, at a temperature of 500° C. or less, degradation of battery characteristics can be suppressed, which would otherwise be caused by, for example, a reaction between the glass-ceramic and the electrode active material. In addition, a carbon material can be used as a negative electrode active material. This can increase the battery energy density. Moreover, a carbon material can also be used as a conductive agent, so that a good electron conducting path can be formed in the positive and negative electrodes to improve the conductivity of the positive and negative electrodes. In this context, the temperature for the compression and firing means the temperature applied to the surface of the glass-ceramic particles aggregate as a solid electrolyte layer precursor.

The time for the compression and firing is preferably from 5 minutes to 30 minutes, more preferably from 5 minutes to 10 minutes. If the time is less than 5 minutes, it may be difficult to obtain the glass-ceramic with a peak A appearing in the range $25°≤2θ≤26°$ and with a peak B appearing in the range $41°≤2θ≤42°$. On the other hand, if the time exceeds 30 minutes, the productivity may decrease.

[3.3 Advantageous Effects]

The glass-ceramic according to the third embodiment has an X-ray diffraction spectrum with a peak A appearing in the range $25°≤2θ≤26°$ and with a peak B appearing in the range $41°≤2θ≤42°$. The glass-ceramic having such peaks can have further improved ionic conductivity.

<4 Fourth Embodiment>

[4.1 Configurations of Battery]

A battery according to a fourth embodiment contains the glass-ceramic of the third embodiment as a solid electrolyte. More specifically, the battery according to the fourth embodiment has a positive electrode, a negative electrode, and a solid electrolyte layer each containing the glass-ceramic of the third embodiment as a solid electrolyte. Except for this point, the battery according to the fourth embodiment has similar configurations to those of the battery according to the second embodiment. Note that the glass-ceramic according to the third embodiment may be used as a binding agent or may be used as a material for serving as both a solid electrolyte and a binding agent.

[4.2 Method for Producing Battery]

Next, a description will be given of an example of a method for producing the battery according to the fourth embodiment of the present technology. The production method includes the steps of forming a positive electrode precursor, a negative electrode precursor, and a solid electrolyte layer precursor using a coating method; and stacking the precursors and compressing and firing the stack.

(Step of Forming Positive Electrode Precursor, Negative Electrode Precursor, and Solid Electrolyte Layer Precursor)

First, similarly to the first embodiment, a glass-ceramic is prepared and then powdered. Subsequently, a positive electrode precursor, a negative electrode precursor, and a solid electrolyte layer precursor are formed similarly to the second embodiment, except that the glass-ceramic (solid electrolyte) is used instead of the glass-ceramic precursor (solid electrolyte precursor).

(Step of Stacking Precursors and Compressing and Firing the Stack)

A battery is prepared as follows using the positive electrode precursor, the negative electrode precursor, and the solid electrolyte layer precursor obtained as described above. First, the positive electrode precursor and the negative electrode precursor are stacked with the solid electrolyte layer precursor sandwiched between them. Subsequently, the stack of the positive electrode precursor, the solid electrolyte layer precursor, and the negative electrode precursor is compressed and fired by, for example, hot pressing. This process changes the crystal structure of the solid electrolyte in the positive electrode precursor, the solid electrolyte layer precursor, and the negative electrode precursor, and creates the solid electrolyte having the peaks A and B mentioned above. The pressure, temperature, and time for the compression and firing may be similar to those in the method for producing the glass-ceramic according to the third embodiment. As a result, the desired battery is obtained having a stack of a positive electrode, a solid electrolyte layer, and a negative electrode.

[4.3 Advantageous Effects]

The battery according to the fourth embodiment of the present technology, which includes a positive electrode, a negative electrode, and a solid electrolyte layer each containing the glass-ceramic according to the third embodiment, can have improved performance.

The battery producing method according to the fourth embodiment of the present technology, in which a stack of a positive electrode precursor, a solid electrolyte layer precursor, and a negative electrode precursor each containing a glass-ceramic is compressed and fired to form a battery, makes it possible to improve electrode density, to improve initial charge-discharge efficiency, to improve cycle characteristics, to improve current characteristics, to improve energy density, to improve electrode strength, and to reduce resistance value (for example, to reduce the interface resistance between the active material and the solid electrolyte (glass-ceramic)). In addition, the glass-ceramic as a solid electrolyte undergoes a reduction in grain boundary, densification, and crystal structure change, which improves the ionic conductivity. In addition, the glass transition temperature Tg can be lowered, so that the firing temperature in the process can be lowered.

Common methods for producing all-solid-state batteries use vary high firing temperatures, which raises concerns about formation of a high-resistance film by side reaction at the interface and characteristic degradation associated therewith. Too high firing temperatures also make it difficult to use graphite for negative electrodes. In contrast, the all-solid-state battery producing method according to the fourth embodiment can suppress the above degradation of characteristics. In addition, the low firing temperature makes it possible to use graphite for negative electrodes.

[4.4 Modifications]

The battery and battery production method according to the fourth embodiment may also be modified similarly to the modifications of the second embodiment. In this regard, the heat treatment in the modifications of the second embodiment should be changed to compression and firing.

<5 Fifth Embodiment>

A fifth embodiment shows an electronic device having the secondary battery according to the second embodiment or the modification thereof.

[5.1 Configuration of Electronic Device]

Figure 4:
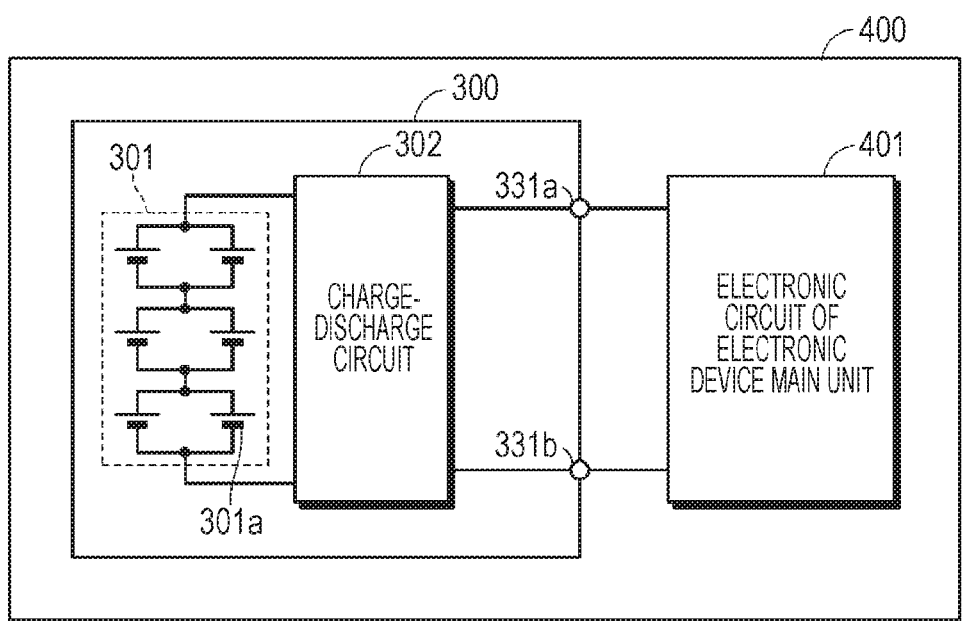
FIG. 4 is a block diagram illustrating an example of the configuration of an electronic device according to a fifth embodiment of the present technology.

Hereinafter, an example of the configuration of an electronic device 400 according to the fifth embodiment of the present technology will be described with reference to FIG. 4. The electronic device 400 includes an electronic circuit 401 of an electronic device main unit and a battery pack 300. The battery pack 300 is electrically connected to the electronic circuit 401 through a positive electrode terminal 331a and a negative electrode terminal 331b. The electronic device 400 has, for example, such a configuration that the battery pack 300 is detachable by the user. Note that it will be understood that the configuration of the electronic device 400 is not limited to the above. Alternatively, the battery pack 300 may be built in the electronic device 400 in such a manner that the battery pack 300 is not removable from the electronic device 400 by the user.

During the charge of the battery pack 300, the positive electrode terminal 331a and the negative electrode terminal 331b of the battery pack 300 are connected to the positive electrode terminal and the negative electrode terminal of a charger (not shown), respectively. On the other hand, during the discharge of the battery pack 300 (during the operation of the electronic device 400), the positive electrode terminal 331a and the negative electrode terminal 331b of the battery pack 300 are connected to the positive electrode terminal and the negative electrode terminal of the electronic circuit 401, respectively.

Examples of the electronic device 400 include, but are not limited to, notebook personal computers, tablet personal computers, cellular phones (such as smart phones), personal digital assistants (PDAs), imaging devices (such as digital still cameras and digital video cameras), audio devices (such as potable audio players), game machines, extension units for cordless phones, electronic books, electronic dictionaries, radios, headphones, navigation systems, memory cards, cardiac pacemakers, hearing aids, lighting devices, toys, medical instruments, and robots.

(Electronic Circuit)

The electronic circuit 401 includes, for example, a central processing unit (CPU), a peripheral logic unit, an interface unit, a storage unit, and other components, and is configured to entirely control the electronic device 400.

(Battery Pack)

The battery pack 300 includes an assembled battery 301 and a charge-discharge circuit 302. The assembled battery 301 includes a plurality of secondary batteries 301a connected in series and/or in parallel. The plurality of secondary batteries 301a is connected, for example, in such a manner that m sets of n batteries in parallel are connected in series (n and m are each a positive integer). In this regard, FIG. 4 shows an example where six secondary batteries 301a are connected in such a manner that three sets of two batteries in parallel are connected in series (2P3S). The secondary battery according to the first embodiment or the modification thereof is used as each secondary battery 301a.

During the charge, the charge-discharge circuit 302 controls the charge of the assembled battery 301. On the other hand, during the discharge (during the operation of the electronic device 400), the charge-discharge circuit 302 controls the discharge to the electronic device 400.

[5.2 Modifications]

The fifth embodiment described above shows an example where the electronic device 400 has an assembled battery 301 including a plurality of secondary batteries 301a. Alternatively, the electronic device 400 may have only one secondary battery 301a instead of the assembled battery 301.

The fifth embodiment described above shows an example where the electronic device has the secondary battery according to the second embodiment or the modification thereof. Alternatively, the electronic device may have the secondary battery according to the fourth embodiment or the modification thereof.

EXAMPLES

Hereinafter, the present technology will be more specifically described with reference to examples. It will be understood that the examples are not intended to limit the present technology in any way.

Examples of the present technology will be described in the following order.
i Evaluation (1) of X-ray analysis spectrum
ii Evaluation of battery characteristics
iii Evaluation of TMA curve and DTA curve
iv Evaluation (2) of X-ray analysis spectrum
v Evaluation of addition of different metals
vi Evaluation of peak area intensity ratio X/Y of Raman spectrum
vii Evaluation of main peak width of Raman spectrum
viii NMR evaluation
ix Evaluation of compressed fired solid electrolytes
x Evaluation of compressed fired electrodes <i Evaluation (1) of X-Ray Analysis Spectrum>

Example 1-1

First, $Li_2O$, $SiO_2$, and $B_2O_3$ were mixed in a molar ratio of $Li_2O:SiO_2:B_2O_3$ of 70.8 mol %:16.7 mol %:12.5 mol % and then melted by heating in the air. Subsequently, the melt was rapidly cooled using a twin roller to form an about 0.5 mm-thick sheet (cullet)-like solid electrolyte precursor. Subsequently, the solid electrolyte precursor was annealed at 380° C. for 2 hours to forma sheet-like solid electrolyte.

Example 1-2

A solid electrolyte was obtained similarly to Example 1-1, except that the precursor annealing conditions were 440° C. for 2 hours.

Comparative Example 1-1

A solid electrolyte was obtained similarly to Example 1-1, except that the precursor annealing conditions were 470° C. for 2 hours.

Comparative Example 1-2

A solid electrolyte precursor was obtained by performing the process before the annealing similarly to Example 1-1.

Example 2-1

First, $Li_2O$, $SiO_2$, and $B_2O_3$ were mixed in a molar ratio of $Li_2O:SiO_2:B_2O_3$ of 54 mol %:11 mol %:35 mol % and then melted by heating in the air. Subsequently, the melt was rapidly cooled using a twin roller to form an about 0.5 mm-thick sheet (cullet)-like solid electrolyte precursor. Subsequently, the solid electrolyte precursor was annealed at 450° C. for 2 hours to forma sheet-like solid electrolyte.

Comparative Example 2-1

A solid electrolyte was obtained similarly to Example 2-1, except that the precursor annealing conditions were 500° C. for 2 hours.

Comparative Example 2-2

A solid electrolyte precursor was obtained by performing the process before the annealing similarly to Example 2-1.

(Evaluation)

The solid electrolytes and the solid electrolyte precursors obtained as described above were used as evaluation samples and evaluated as described below. Note that in the X-ray diffraction measurement, both sheet-like samples were ground in, for example, a ball mill or an agate mortar and then subjected to the measurement. In addition, in the ionic conductivity measurement, both sheet-like samples were directly subjected to the measurement without being ground.

(X-Ray Diffraction)

Each evaluation sample was subjected to X-ray diffraction using CuKα as a ray source and measured for X-ray diffraction spectrum. The structure of each sample was identified on the basis of the result of the measurement. The results are shown in Table 1. Note that the measurement was performed using SmartLab (3 kw) manufactured by Rigaku Corporation.

Figure 5:
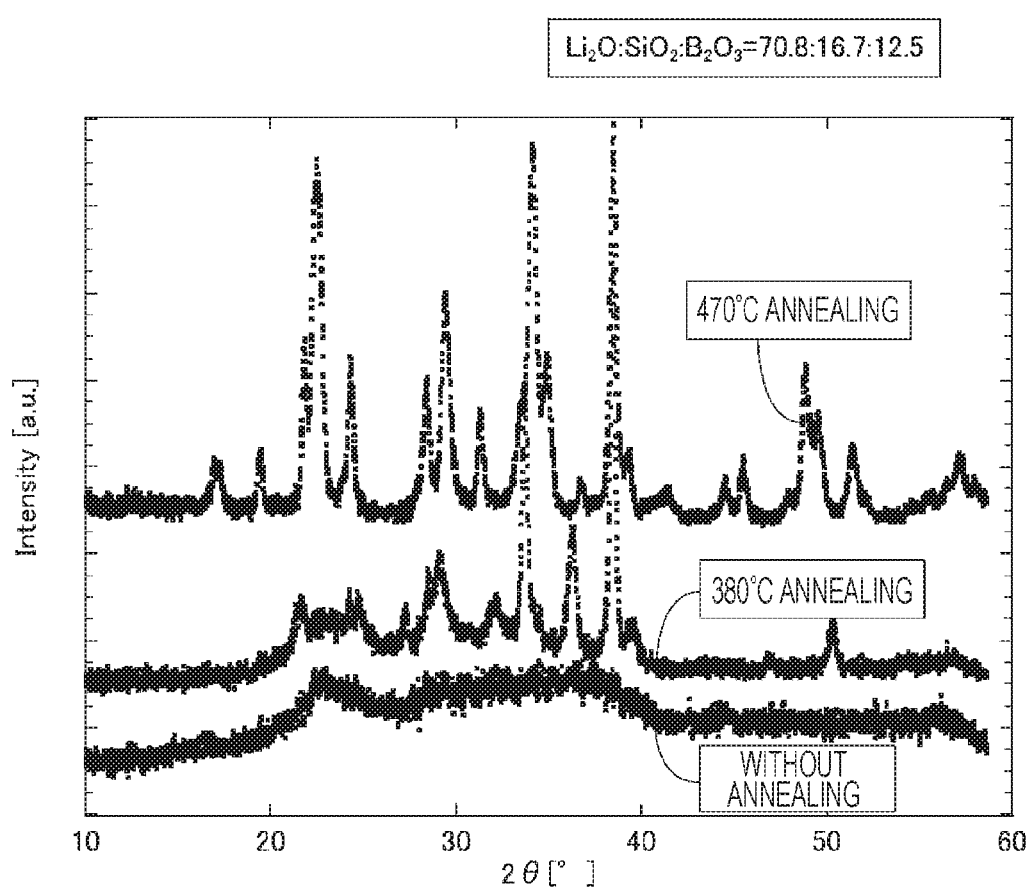
FIG. 5 is a graph showing the X-ray diffraction spectra of the evaluation samples of Example 1-1 and Comparative Examples 1-1 and 1-2.

FIG. 5 shows the X-ray diffraction spectra of the solid electrolytes of Example 1-1 and Comparative Example 1-1 and the solid electrolyte precursor of Comparative Example 1-2. Hereinafter, a method for identifying the structure of each evaluation sample based on the X-ray diffraction spectrum will be described with reference to FIG. 5.

A halo peak is detected for the solid electrolyte precursor having undergone no annealing (Comparative Example 1-2). From this result, the solid electrolyte precursor having undergone no annealing is identified as a glass.

At least two peaks derived from crystal structure are detected in the ranges 20°≤2θ≤25° and 25°<2θ≤30°, respectively, for the solid electrolyte having undergone annealing at 380° C. (Example 1-1). A halo peak is also detected. From this result, the solid electrolyte having undergone annealing at 380° C. is identified as a mixture of crystal and amorphous materials, namely, a glass-ceramic.

The solid electrolyte having undergone annealing at 470° C. (Comparative Example 1-1) have peaks sharper than those of the solid electrolyte having undergone annealing at 380° C. In addition, no halo peak is detected. From this result, the solid electrolyte having undergone annealing at 470° C. is identified as a crystal.

Table 1 shows the results of the evaluation of the evaluation samples.

TABLE 1

| | Raw materials | | | Annealing | | XRD evaluation results |
|---|---|---|---|---|---|---|
| | $Li_2O$ [mol %] | $SiO_2$ [mol %] | $B_2O_3$ [mol %] | Temperature [° C.] | Time [h] | |
| Example 1-1 | 70.8 | 16.7 | 12.5 | 380 | 2 | Glass-ceramic |
| Example 1-2 | | | | 440 | 2 | Glass-ceramic |
| Comparative Example 1-1 | | | | 470 | 2 | Crystal |
| Comparative Example 1-2 | | | | — | — | Glass |
| Example 2-1 | 54 | 11 | 35 | 450 | 2 | Glass-ceramic |
| Comparative Example 2-1 | | | | 500 | 2 | Crystal |
| Comparative Example 2-2 | | | | — | — | Glass |

Table 1 shows that a glass-ceramic solid electrolyte is successfully obtained when the annealing temperature is set in a specific range.

(Ionic Conductivity)

Figure 6:
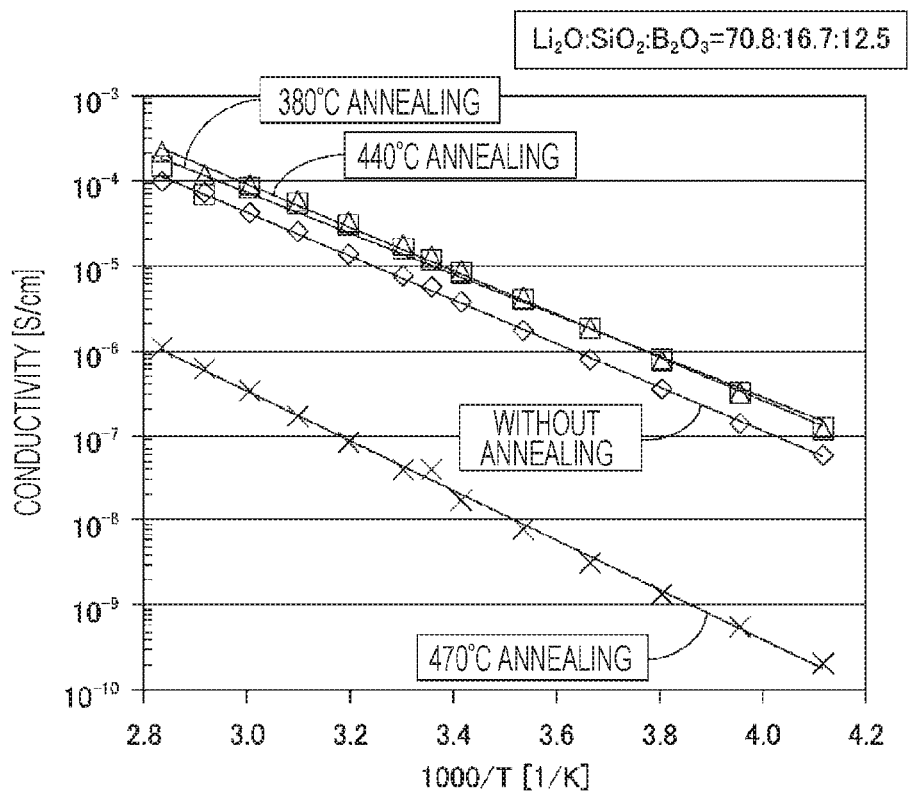
FIG. 6A is a graph showing the ionic conductivities of the evaluation samples of Examples 1-1 and 1-2 and Comparative Examples 1-1 and 1-2.
FIG. 6B is a graph showing the ionic conductivities of the evaluation samples of Example 2-1 and Comparative Examples 2-1 and 2-2.
Figure 6:
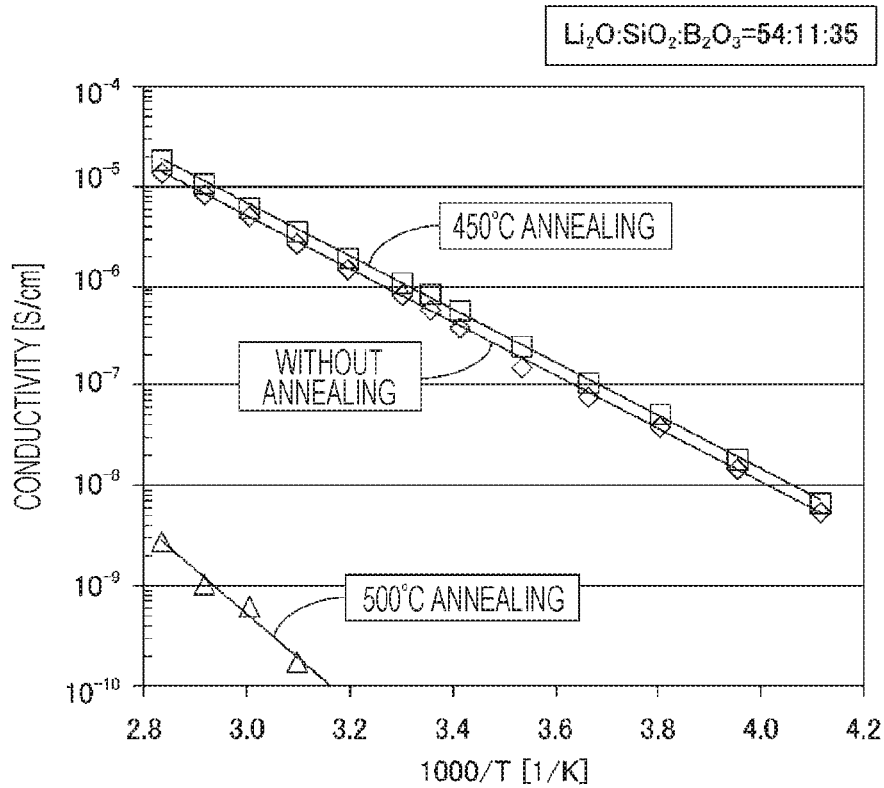
Figure 7:
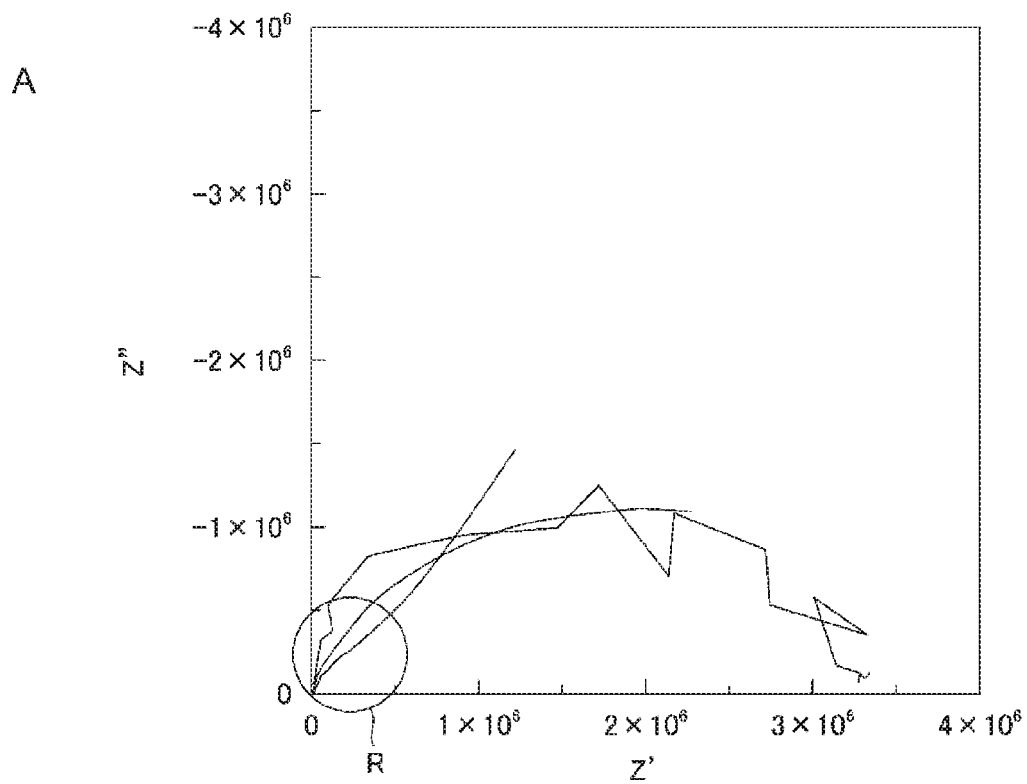
FIG. 7A is a graph showing the Cole-Cole plot of the evaluation sample of Example 1-1.
FIG. 7B is a graph showing an enlargement of the region R of the Cole-Cole plot of FIG. 7A.
Figure 7:
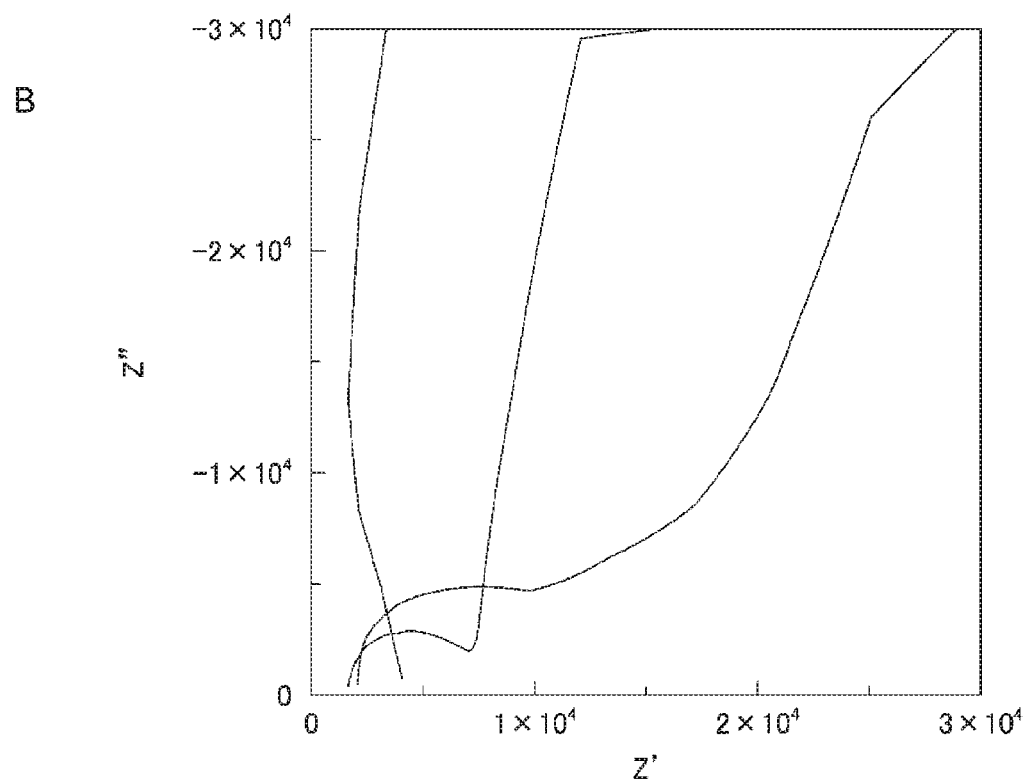

After gold (Au) was vapor-deposited to form electrodes on both sides of each evaluation sample, the sample was subjected to AC impedance measurement (25° C.) in order to make a Cole-Cole plot. Subsequently, the ionic conductivity was determined from the Cole-Cole plot. The results are shown in FIGS. 6A and 6B. Note that the approximate straight lines in FIGS. 6A and 6B are calculated by least squares method (exponential approximation). The measurement system used was Solartron 1260/1287 manufactured by Solartron Metrology, and the measurement frequency was from 1 Hz to 1 MHz. FIG. 7A shows the Cole-Cole plot of the solid electrolyte of Example 1-1. In addition, FIG. 7B shows an enlargement of the region R of the Cole-Cole plot of FIG. 7A.

FIG. 6A shows the following.

The solid electrolyte (glass-ceramic) having undergone annealing at 380° C. or 440° C. has ionic conductivity higher than that of the solid electrolyte precursor (glass) having undergone no annealing. The solid electrolyte (crystal) having undergone annealing at 470° C. has ionic conductivity lower than that of the solid electrolyte precursor (glass) having undergone no annealing.

FIG. 6B shows the following.

The solid electrolyte (glass-ceramic) having undergone annealing at 450° C. has ionic conductivity higher than that of the solid electrolyte precursor (glass) having undergone no annealing. The solid electrolyte (crystal) having undergone annealing at 500° C. has ionic conductivity lower than that of the solid electrolyte precursor (glass) having undergone no annealing.

<ii Evaluation of Battery Characteristics>

Example 3-1

[Step of Preparing Solid Electrolyte Pellet]

First, a $Li_6BaLa_2Ta_2O_{12}$ powder was formed into a pellet with a diameter of 13 mmφ. The particles in the pellet were bonded together by firing at 1,000° C. for 8 hours. Subsequently, the thickness of the pellet was reduced to 0.3 mm by polishing both sides of the pellet. In this way, a solid electrolyte substrate was formed.

[Step of Preparing Positive Electrode Slurry and Forming Positive Electrode]

The materials shown below were weighed and then stirred to form a positive electrode slurry with a weight ratio of the positive electrode active material to the solid electrolyte precursor (positive electrode active material:solid electrolyte precursor) of 50:50.

Positive electrode active material: 3 g of $LiCoO_2$
Solid electrolyte precursor: 3 g of a powder of the solid electrolyte precursor of Example 2-1
Thickener: 1.07 g of an acrylic binding agent
Solvent: 6.25 g of terpineol Subsequently, the prepared positive electrode slurry was applied to a 6 mmφ area of the solid electrolyte substrate by screen printing. The slurry was dried at 100° C. and then annealed at 420° C. for 10 minutes to form a 3 μm-thick positive electrode.

[Step of Assembling all-Solid-State Battery]

First, a Pt thin film was formed as a collector layer on the positive electrode by sputtering, and then an Al foil was bonded to the Pt thin film. Subsequently, a negative electrode was formed by bonding a Li/Cu metal foil to the substrate surface opposite to the positive electrode and then pressing the foil by cold isostatic pressing under the condition of a pressure of 200 MPa. As a result, the desired battery (all-solid-state lithium ion secondary battery) was obtained.

(Evaluation)

The battery obtained as described above was used as an evaluation sample and evaluated as described below.

(Charge-Discharge Curve)

The evaluation sample was charged and discharged under the measurement conditions below when a charge-discharge curve was determined. The results are shown in FIG. 8.

Measurement conditions: cut-off voltage 4.2V/3V, current 0.1 μA (c.c)

Figure 8:
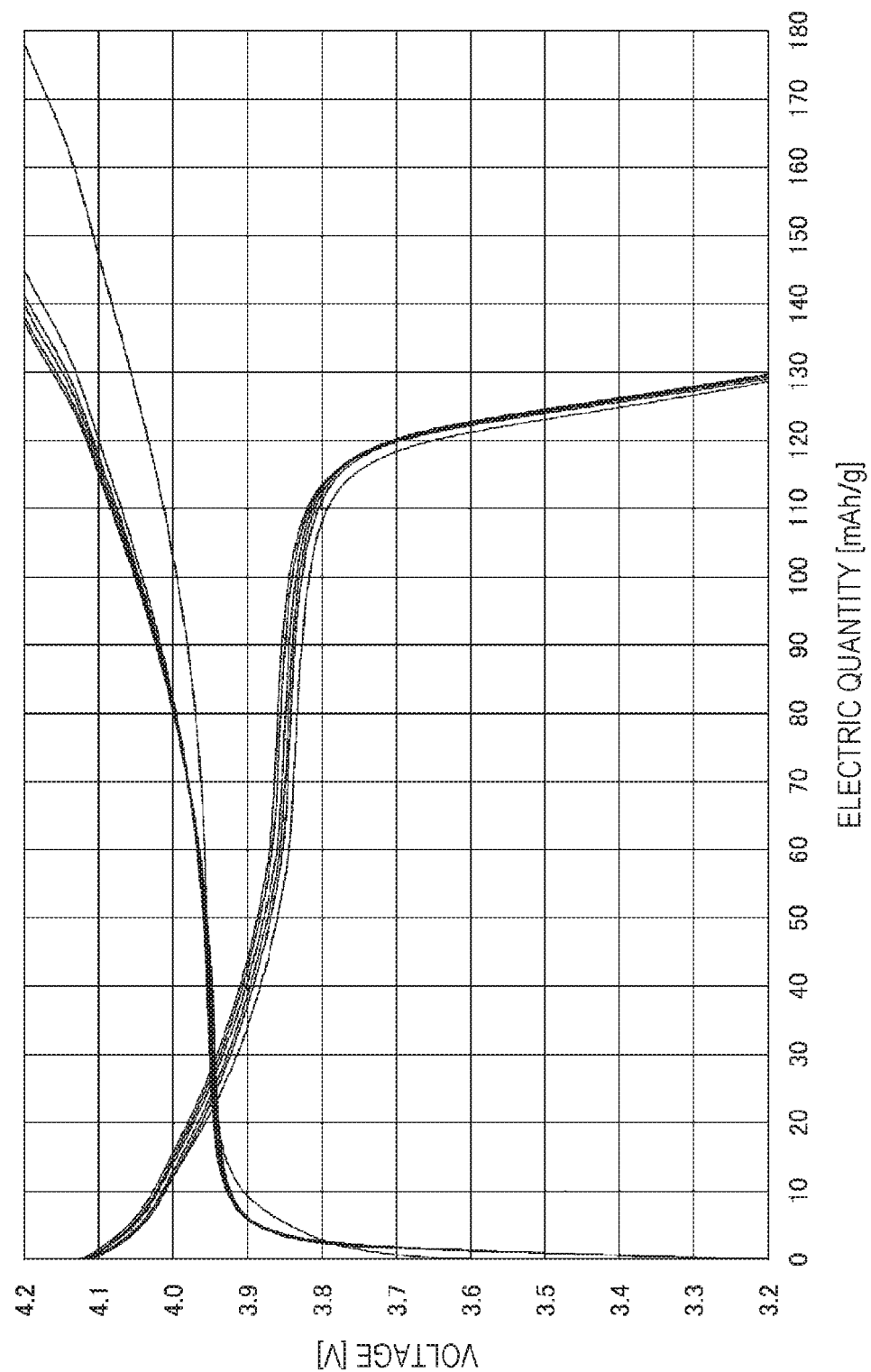
FIG. 8 is a graph showing the results of measurement of the charge-discharge curve of the battery of Example 3-1.

FIG. 8 shows that the battery of Example 3-1 has good charge-discharge characteristics.

(Cycle Characteristics)

The evaluation sample was charged and discharged under the measurement conditions below when cycle characteristics (initial capacity retention) were determined. The results are shown in FIG. 9.

Figure 9:
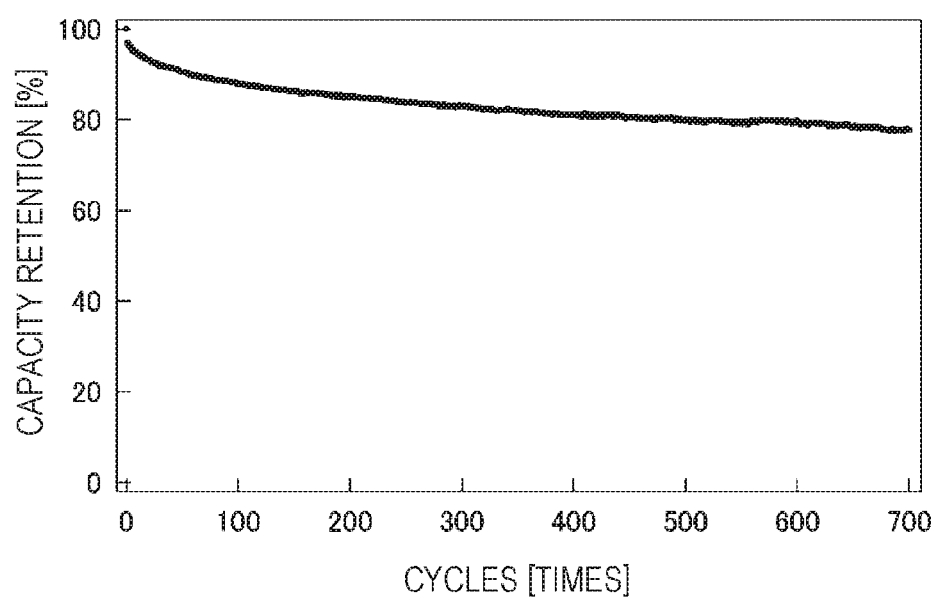
FIG. 9 is a graph showing the results of evaluation of the cycle characteristics of the battery of Example 3-1.

Measurement conditions: environmental temperature 25° C., rate 0.3 C, voltage range 2.5 V-4.2 V FIG. 9 shows that even after 700 cycles, a capacity retention of about 80% is obtained with no significant decrease in cycle characteristics.

<iii Evaluation of TMA Curve and DTA Curve>

Reference Example 1-1

A solid electrolyte precursor was obtained by performing the process before the annealing similarly to Example 1-1.

Reference Example 2-1

A solid electrolyte precursor was obtained by performing the process before the annealing similarly to Example 2-1.

(Measurement of TMA Curve and DTA Curve)

Figure 10:
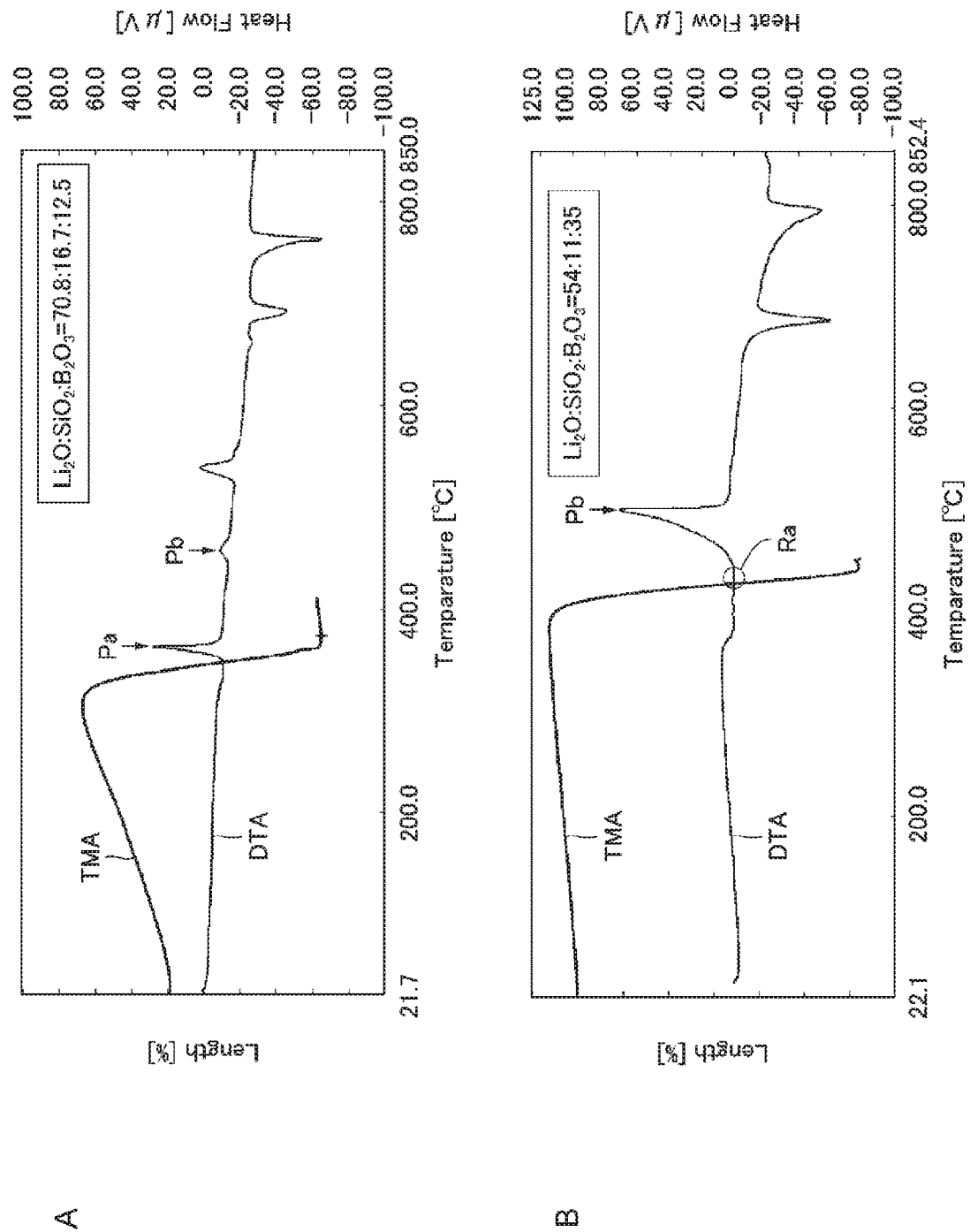
FIG. 10A is a graph showing the results of measurement of the TMA and DTA curves of the precursor of Reference Example 1-1.
FIG. 10B is a graph showing the results of measurement of the TMA and DTA curves of the precursor of Reference Example 2-1.
Figure 11:
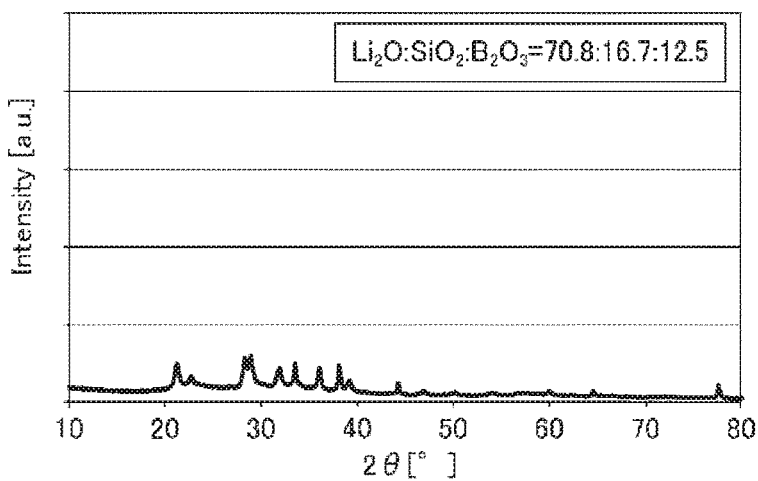
FIGS. 11A to 11C are graphs showing the results of measurement of the X-ray diffraction spectra of the evaluation samples of Examples 4-1 to 4-3, respectively.
Figure 11:
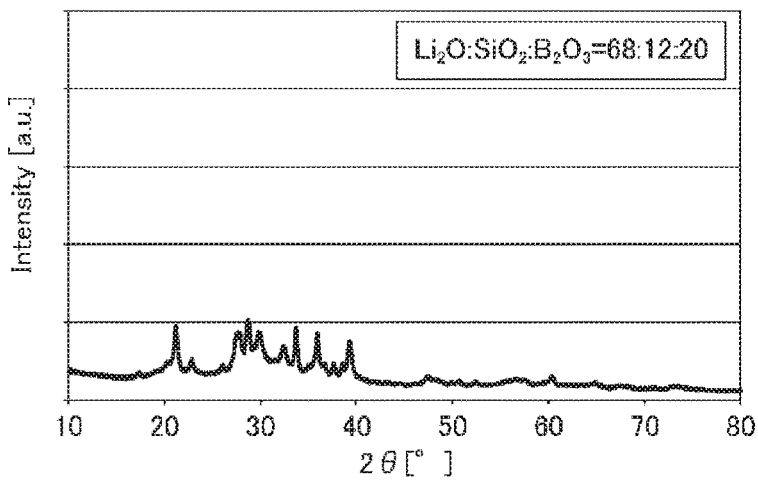
Figure 11:
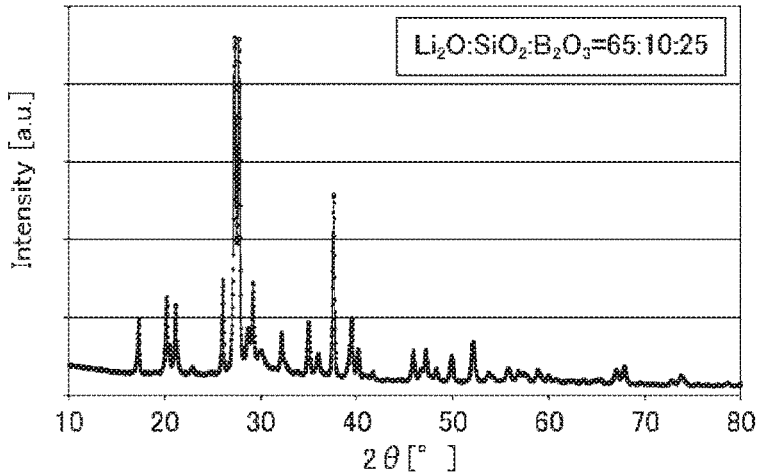
Figure 12:
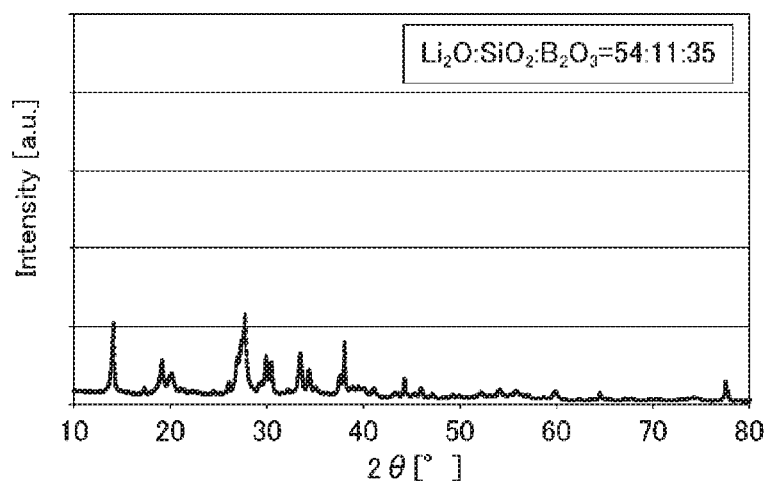
FIGS. 12A to 12C are graphs showing the results of measurement of the X-ray diffraction spectra of the evaluation samples of Examples 4-4 to 4-6, respectively.
Figure 12:
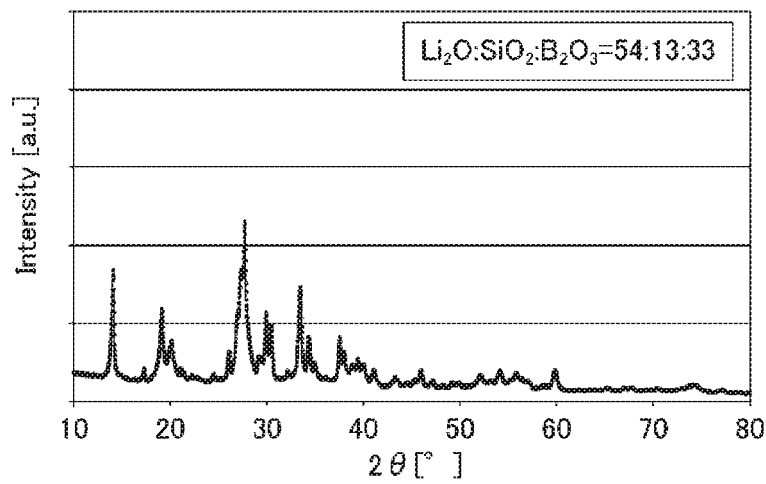
Figure 12:
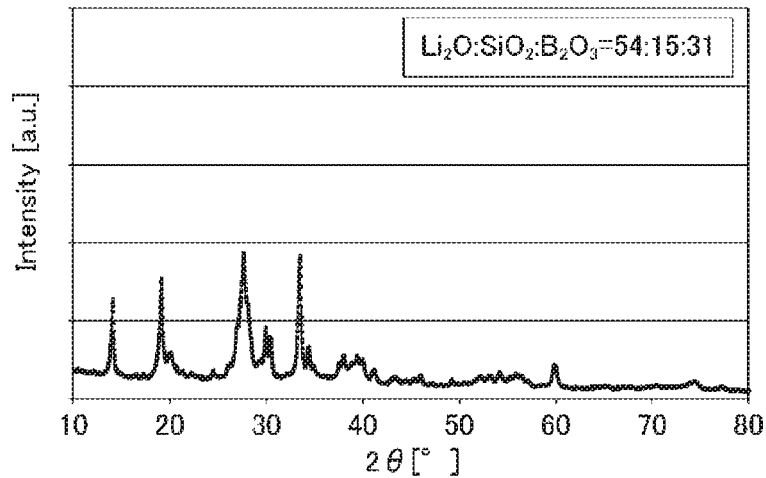
Figure 13:
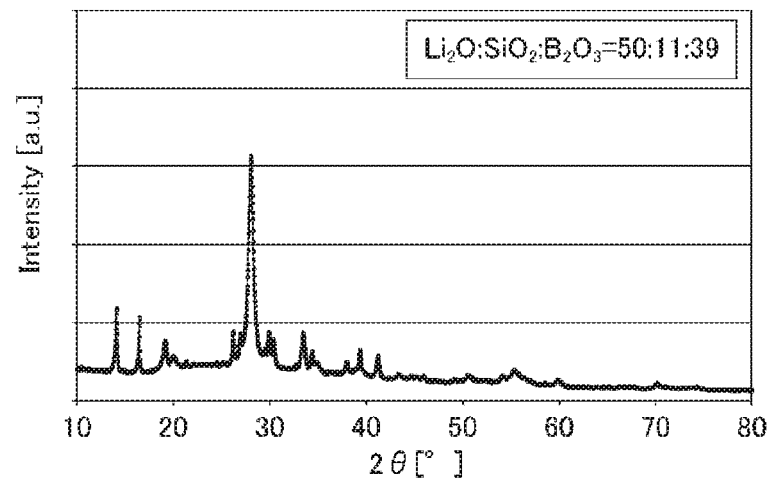
FIGS. 13A and 13B are graphs showing the results of measurement of the X-ray diffraction spectra of the evaluation samples of Examples 4-7 and 4-8, respectively.
Figure 13:
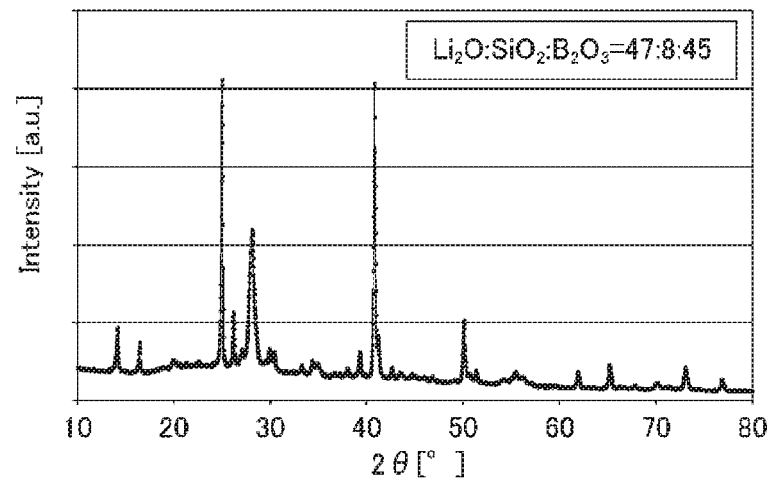
Figure 14:
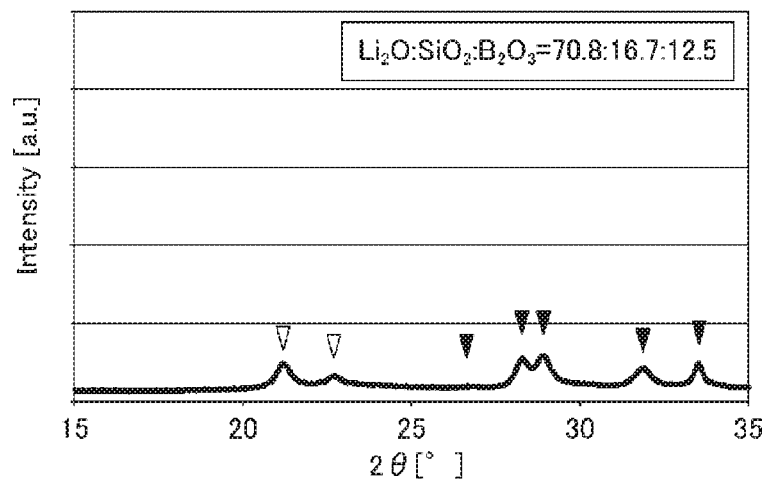
FIGS. 14A to 14C are graphs showing enlargements of parts of the X-ray diffraction spectra shown in FIGS. 11A to 11C, respectively.
Figure 14:
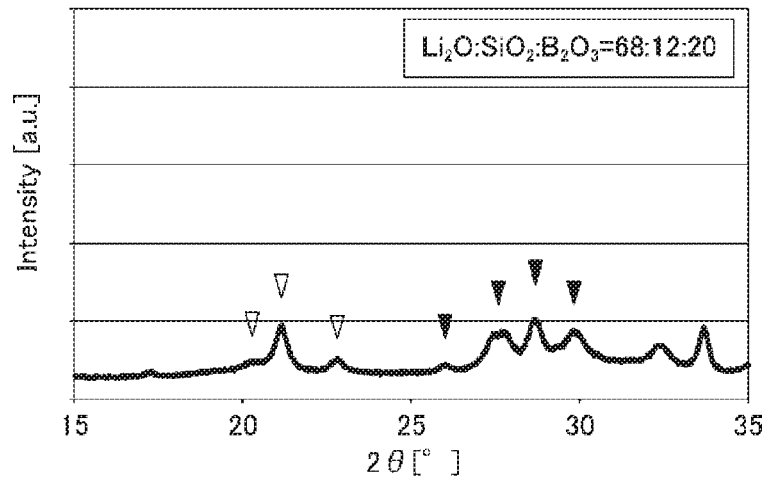
Figure 14:
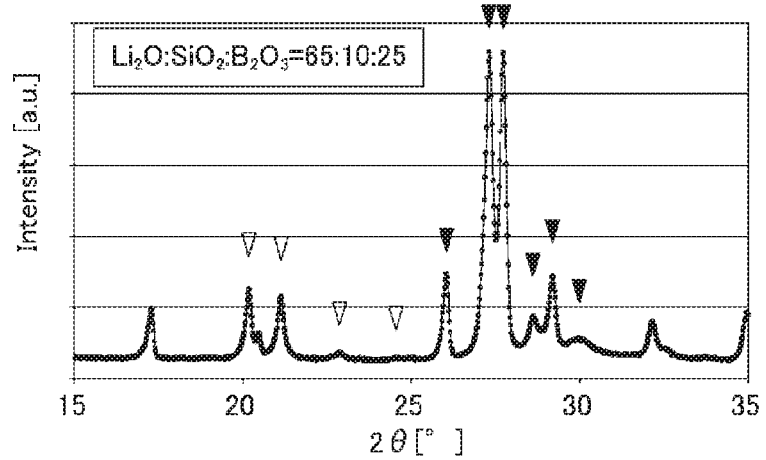
Figure 15:
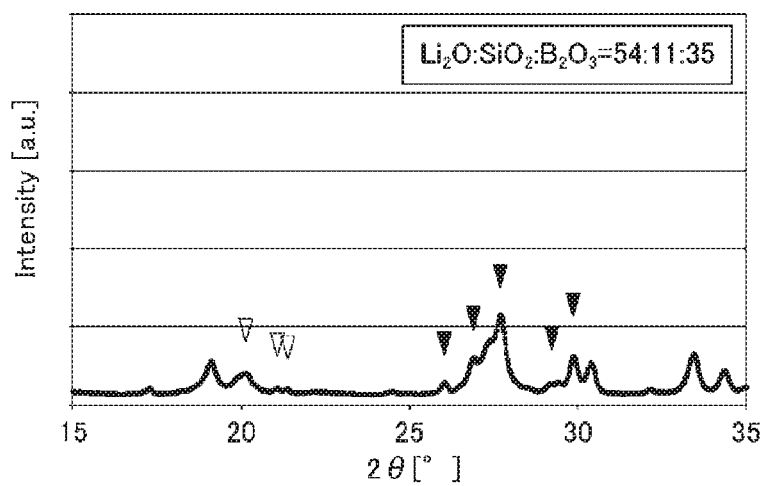
FIGS. 15A to 15C are graphs showing enlargements of parts of the X-ray diffraction spectra shown in FIGS. 12A to 12C, respectively.
Figure 15:
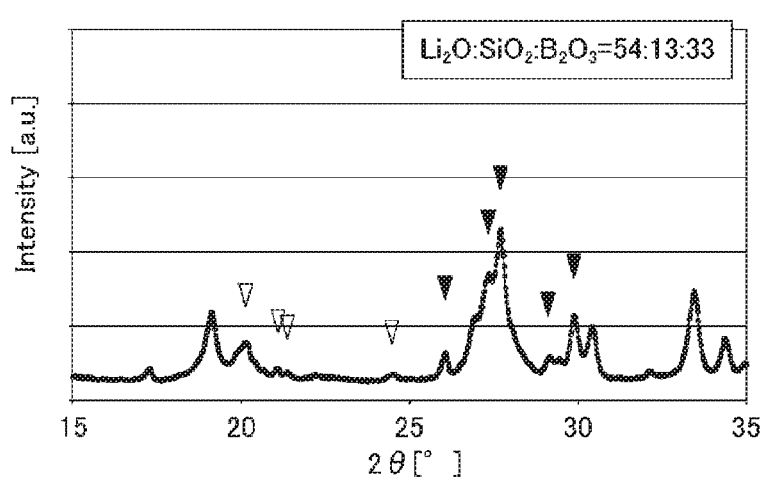
Figure 15:
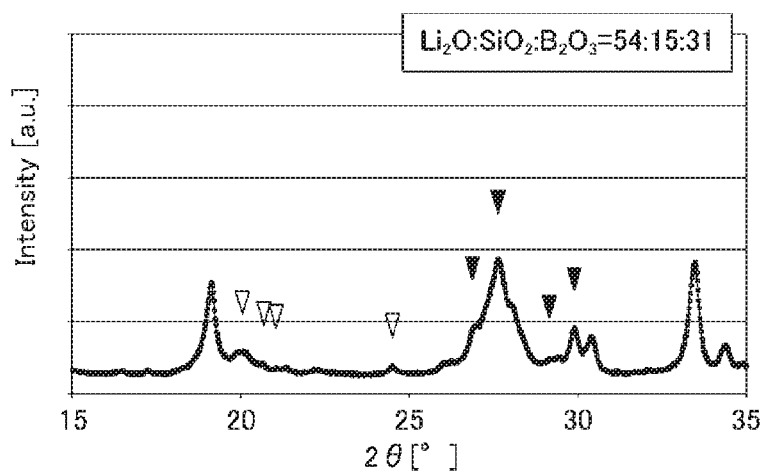
Figure 16:
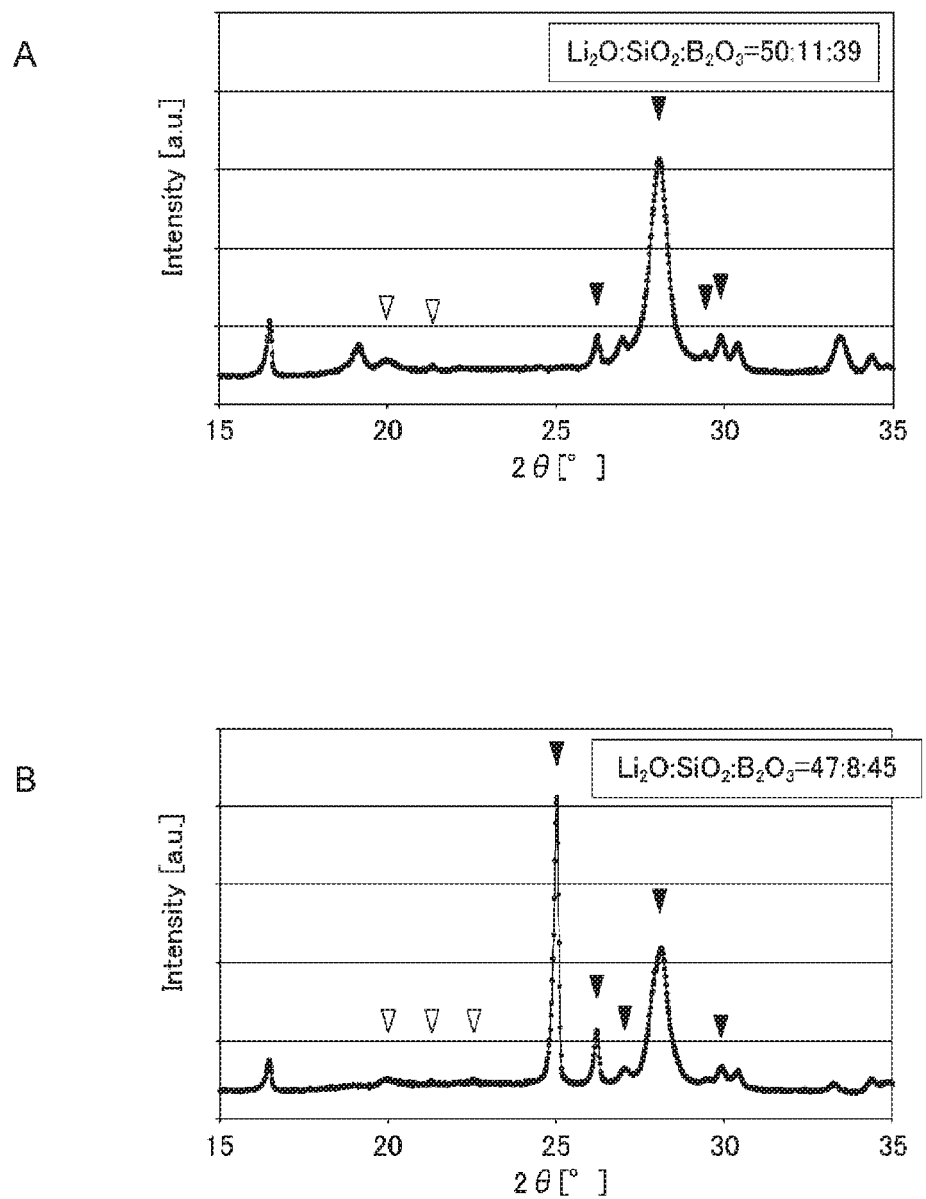
FIGS. 16A and 16B are graphs showing enlargements of parts of the X-ray diffraction spectra shown in FIGS. 13A and 13B, respectively.

TMA and DTA curves were measured for the precursors of Reference Examples 1-1 and 2-1 obtained as described above. The results are shown in FIGS. 10A and 10B. Note that the TMA measurement was performed using Thermo EVO TMA8310 manufactured by Rigaku Corporation, and the DTA measurement was performed using Thermo EVO TG8120 manufactured by Rigaku Corporation.

FIG. 10A shows the following.

The TMA curve of Reference Example 1-1 shows softening-induced contraction starting from about 300° C.

The DTA curve of Reference Example 1-1 shows exothermic peaks Pa and Pb. The peak Pa indicates that the solid electrolyte precursor turns from glass to glass-ceramic. On the other hand, the peak Pb indicates that the glass-ceramic produced at the peak Pa undergoes a phase transition to a crystal.

These results suggest that the improved ionic conductivity of the solid electrolyte of Example 1-1 above should be due to the change from the precursor to the glass-ceramic by annealing at 380° C. It is also suggested that the lower ionic conductivity of the solid electrolyte of Comparative Example 1-1 above should be due to the phase transition from the formed glass-ceramic to the crystal by annealing at 470° C.

FIG. 10B shows the following.

The TMA curve of Reference Example 2-1 shows softening-induced contraction starting from about 400° C.

An exothermic peak Pa should actually appear at the position of the region Ra, though the DTA curve of Reference Example 2-1 does not clearly show such a peak due to the system sensitivity problem. It is therefore suggested that similarly to Reference Example 1-1, the solid electrolyte precursor should turn from glass to glass-ceramic at or near the point indicated by the region Ra.

<iv Evaluation (2) of X-Ray Analysis Spectrum>

Example 4-1

First, $Li_2O$, $SiO_2$, and $B_2O_3$ were mixed in a molar ratio of $Li_2O:SiO_2:B_2O_3$ of 70.8 mol %:16.7 mol %:12.5 mol % and then melted by heating in the air. Subsequently, the melt was rapidly cooled using a twin roller to form an about 0.5 mm-thick sheet (cullet)-like solid electrolyte precursor. Subsequently, the solid electrolyte precursor was annealed at 380° C. for 2 hours to form a sheet-like solid electrolyte.

Example 4-2

$Li_2O$, $SiO_2$, and $B_2O_3$ were mixed in a molar ratio of $Li_2O:SiO_2:B_2O_3$ of 68 mol %:12 mol %:20 mol %. In addition, the solid electrolyte precursor was annealed under the conditions of 380° C. and 2 hours. A solid electrolyte was obtained similarly to Example 4-1, except for the above.

Example 4-3

$Li_2O$, $SiO_2$, and $B_2O_3$ were mixed in a molar ratio of $Li_2O:SiO_2:B_2O_3$ of 65 mol %:10 mol %:25 mol %. In addition, the solid electrolyte precursor was annealed under the conditions of 380° C. and 2 hours. A solid electrolyte was obtained similarly to Example 4-1, except for the above.

Example 4-4

$Li_2O$, $SiO_2$, and $B_2O_3$ were mixed in a molar ratio of $Li_2O:SiO_2:B_2O_3$ of 54 mol %:11 mol %:35 mol %. In addition, the solid electrolyte precursor was annealed under the conditions of 440° C. and 2 hours. A solid electrolyte was obtained similarly to Example 4-1, except for the above.

Example 4-5

$Li_2O$, $SiO_2$, and $B_2O_3$ were mixed in a molar ratio of $Li_2O:SiO_2:B_2O_3$ of 54 mol %:13 mol %:33 mol %. In addition, the solid electrolyte precursor was annealed under the conditions of 440° C. and 2 hours. A solid electrolyte was obtained similarly to Example 4-1, except for the above.

Example 4-6

$Li_2O$, $SiO_2$, and $B_2O_3$ were mixed in a molar ratio of $Li_2O:SiO_2:B_2O_3$ of 54 mol %:15 mol %:31 mol %. In addition, the solid electrolyte precursor was annealed under the conditions of 440° C. and 2 hours. A solid electrolyte was obtained similarly to Example 4-1, except for the above.

Example 4-7

$Li_2O$, $SiO_2$, and $B_2O_3$ were mixed in a molar ratio of $Li_2O:SiO_2: B_2O_3$ of 50 mol %:11 mol % 39 mol %. In addition, the solid electrolyte precursor was annealed under the conditions of 460° C. and 2 hours. A solid electrolyte was obtained similarly to Example 4-1, except for the above.

Example 4-8

$Li_2O$, $SiO_2$, and $B_2O_3$ were mixed in a molar ratio of $Li_2O:SiO_2:B_2O_3$ of 47 mol %:8 mol %:45 mol %. In addition, the solid electrolyte precursor was annealed under the conditions of 500° C. and 2 hours. A solid electrolyte was obtained similarly to Example 4-1, except for the above.

(Evaluation)

The solid electrolytes obtained as described above were used as evaluation samples and evaluated as described below. Note that in the X-ray diffraction measurement, each sheet-like sample was ground in, for example, a ball mill or an agate mortar and then subjected to the measurement.

(X-Ray Diffraction)

The X-ray diffraction pattern of each evaluation sample was measured using CuKα as a ray source. The results are shown in FIGS. 11A to 13B. In addition, FIGS. 14A to 16B each show an enlargement of part of each of FIGS. 11A to 13B. The structure of each sample was identified on the basis of the result of the measurement. The results are shown in Table 2. Note that the measurement was performed using SmartLab (3 kw) manufactured by Rigaku Corporation.

Table 2 shows the results of the evaluation of the evaluation samples.

TABLE 2

| | Raw materials | | | Annealing | | XRD evaluation results |
|---|---|---|---|---|---|---|
| | $Li_2O$ [mol %] | $SiO_2$ [mol %] | $B_2O_3$ [mol %] | Temperature [° C.] | Time [h] | |
| Example 4-1 | 70.8 | 16.7 | 12.5 | 380 | 2 | Glass-ceramic |
| Example 4-2 | 68 | 12 | 20 | 380 | 2 | Glass-ceramic |
| Example 4-3 | 65 | 10 | 25 | 380 | 2 | Glass-ceramic |
| Example 4-4 | 54 | 11 | 35 | 440 | 2 | Glass-ceramic |
| Example 4-5 | 54 | 13 | 33 | 440 | 2 | Glass-ceramic |
| Example 4-6 | 54 | 15 | 31 | 440 | 2 | Glass-ceramic |
| Example 4-7 | 50 | 11 | 39 | 460 | 2 | Glass-ceramic |
| Example 4-8 | 47 | 8 | 45 | 500 | 2 | Glass-ceramic |

FIGS. 11A to 13B, FIGS. 14A to 16B, and Table 2 show the following.

At least two peaks derived from crystal structure are detected in the ranges 20°≤2θ≤25° and 25°<2θ≤30°, respectively, in the X-ray diffraction spectra of the solid electrolytes of Examples 4-1 to 4-8. In the X-ray diffraction spectra shown in FIGS. 11A to 13B and FIGS. 14A to 16B, the positions of peaks appearing in the ranges 20°≤2θ≤25° and 25°<2θ≤30°, respectively, slightly differ between the samples. Nevertheless, solid electrolytes with at least two peaks detected in these diffraction angle 2θ ranges can have good ionic conductivity regardless of peak position difference. Note that, although not clear, the cause of the difference in peak position would be a difference in crystal structure between the measurement samples or a difference in lattice constant between the measurement samples.

It is therefore concluded that a solid electrolyte having these peaks can be obtained by preparing a solid electrolyte precursor with a $Li_2O$ content of 40 mol % to 73 mol %, a $SiO_2$ content of 8 mol % to 40 mol %, and a $B_2O_3$ content of 10 mol % to 50 mol % and then annealing the solid electrolyte precursor under specific conditions. In this regard, the content of each amorphous material ($Li_2O$, $SiO_2$, $B_2O_3$) is based on the total amount of $Li_2O$, $SiO_2$, and $B_2O_3$, which corresponds to 100 mol %.

<v. Evaluation of Addition of Different Metals>

Example 5-1

First, $Li_2O$, $SiO_2$, and $B_2O_3$ were mixed in a molar ratio of $Li_2O:SiO_2:B_2O_3$ of 54 mol %:11 mol %:35 mol % and then melted by heating in the air. Subsequently, the melt was rapidly cooled using a twin roller to form an about 0.5 mm-thick sheet (cullet)-like solid electrolyte precursor. Subsequently, the solid electrolyte precursor was annealed in the temperature range of 440 to 450° C. for 2 hours to form a sheet-like solid electrolyte.

Examples 5-2 to 5-8

Each solid electrolyte was obtained similarly to Example 5-1, except that an additive (MxOy) different from sample to sample was further mixed into a mixture of $Li_2O$, $SiO_2$, and $B_2O_3$ ($Li_2O:SiO_2:B_2O_3$=51.4 mol %:10.5 mol %:33.3 mol %). Note that the additive used was ZnO, $Y_2O_3$, $La_2O_3$, $TiO_2$, $ZrO_2$, $GeO_2$, or $TaO_2$.

Note that each additive was added in an amount of 4.8 mol %.

Example 5-9

$Li_2O$, $SiO_2$, and $B_2O_3$ were mixed in a molar ratio of $Li_2O:SiO_2:B_2O_3$ of 55 mol %:11 mol %:33 mol %. In addition, the additive (MxOy) used was 1CaO. A solid electrolyte was obtained similarly to Examples 5-2 to 5-9, except for the above.

Comparative Examples 5-1 to 5-9

Each solid electrolyte precursor was obtained by performing the process before the annealing similarly to each of Examples 5-1 to 5-9.

(Evaluation)

The solid electrolytes and the solid electrolyte precursors obtained as described above were used as evaluation samples and evaluated as described below. Note that in the X-ray diffraction measurement, each sheet-like sample was ground in, for example, a ball mill or an agate mortar and then subjected to the measurement. In addition, in the ionic conductivity measurement, each sheet-like sample was directly subjected to the measurement without being ground.

(X-Ray Diffraction)

Each evaluation sample was subjected to X-ray diffraction using CuKα as a ray source and measured for X-ray diffraction spectrum. The structure of each sample was identified on the basis of the result of the measurement. The results are shown in Table 3. Note that the measurement was performed using SmartLab (3 kw) manufactured by Rigaku Corporation.

(Ionic Conductivity)

The ionic conductivity of the solid electrolytes was measured similarly to Example 1-1. The results are shown in Table 3.

Table 3 shows the results of the evaluation of the evaluation samples.

TABLE 3

| | Basic raw materials | | | Additive | Presence or | Annealing | | XRD | Ionic |
|---|---|---|---|---|---|---|---|---|---|
| | $Li_2O$ [mol %] | $SiO_2$ [mol %] | $B_2O_3$ [mol %] | $M_xO_y$ [mol %] | absence of annealing | Temperature [° C.] | Time [h] | evaluation results | conductivity [S/cm] |
| Example 5-1 | 54 | 11 | 35 | — | Present | 440-450 | 2 | Glass-ceramic | $8.7 \times 10^{-7}$ |
| Comparative Example 5-1 | | | | | Absent | — | — | Glass | $6.4 \times 10^{-7}$ |
| Example 5-2 | 51.4 | 10.5 | 33.3 | 4.8(ZnO) | Present | 450 | 2 | Glass-ceramic | $6.4 \times 10^{-8}$ |
| Comparative Example 5-2 | | | | | Absent | — | — | Glass | $5.8 \times 10^{-8}$ |
| Example 5-3 | 51.4 | 10.5 | 33.3 | 4.8($Y_2O_3$) | Present | 450 | 2 | Glass-ceramic | $4.8 \times 10^{-7}$ |
| Comparative Example 5-3 | | | | | Absent | — | — | Glass | $2.8 \times 10^{-7}$ |
| Example 5-4 | 51.4 | 10.5 | 33.3 | 4.8($La_2O_3$) | Present | 450 | 2 | Glass-ceramic | $2.1 \times 10^{-7}$ |
| Comparative Example 5-4 | | | | | Absent | — | — | Glass | $1.6 \times 10^{-7}$ |
| Example 5-5 | 51.4 | 10.5 | 33.3 | 4.8($TiO_2$) | Present | 455 | 2 | Glass-ceramic | $4.8 \times 10^{-7}$ |
| Comparative Example 5-5 | | | | | Absent | — | — | Glass | $4.3 \times 10^{-7}$ |
| Example 5-6 | 51.4 | 10.5 | 33.3 | 4.8($ZrO_2$) | Present | 455 | 2 | Glass-ceramic | $6.1 \times 10^{-7}$ |
| Comparative Example 5-6 | | | | | Absent | — | — | Glass | $4.6 \times 10^{-7}$ |
| Example 5-7 | 51.4 | 10.5 | 33.3 | 4.8($GeO_2$) | Present | 455 | 2 | Glass-ceramic | $5.1 \times 10^{-7}$ |
| Comparative | | | | | Absent | — | — | Glass | $4.1 \times 10^{-7}$ |

TABLE 3-continued

| | Basic raw materials | | | Additive | Presence or absence of annealing | Annealing | | XRD evaluation results | Ionic conductivity [S/cm] |
| | $Li_2O$ [mol %] | $SiO_2$ [mol %] | $B_2O_3$ [mol %] | $M_xO_y$ [mol %] | | Temperature [° C.] | Time [h] | | |
|---|---|---|---|---|---|---|---|---|---|
| Example 5-7 | | | | | | | | | |
| Example 5-8 | 51.4 | 10.5 | 33.3 | 4.8($Ta_2O_5$) | Present | 500 | 2 | Glass-ceramic | $8.2 \times 10^{-7}$ |
| Comparative Example 5-8 | | | | | Absent | — | — | Glass | $5.4 \times 10^{-7}$ |
| Example 5-9 | 55 | 11 | 33 | 4.8(CaO) | Present | 428 | 2 | Glass-ceramic | $8.0 \times 10^{-7}$ |
| Comparative Example 5-9 | | | | | Absent | — | — | Glass | $4.2 \times 10^{-7}$ |

Note that at least two peaks derived from crystal structure were detected in the ranges $20° \leq 2\theta \leq 25°$ and $25° < 2\theta \leq 30°$, respectively, in the X-ray diffraction spectra of the solid electrolytes (glass-ceramic) of Examples 5-1, 5-2, 5-3, 5-4, 5-5, 5-6, 5-6, 5-7, 5-8, and 5-9. On the other hand, at least two peaks derived from crystal structure were not detected in the ranges $20° \leq 2\theta \leq 25°$ and $25° < 2\theta \leq 30°$, respectively, in the X-ray diffraction spectra of the solid electrolyte precursors (glass) of Comparative Examples 5-1, 5-2, 5-3, 5-4, 5-5, 5-6, 5-6, 5-7, 5-8, and 5-9.

Table 3 shows that the solid electrolyte obtained by annealing the solid electrolyte precursor under specific conditions can have improved ionic conductivity even when further containing Zn, Y, La, Ti, Zr, Ge, Ta, or Ca in addition to Li, Si, and B.

<vi Evaluation of Peak Area Intensity Ratio X/Y of Raman Spectrum>

Examples 6-1 to 6-3 and Comparative Examples 6-1 to 6-5

First, $Li_2O$, $SiO_2$, and $B_2O_3$ were mixed in a molar ratio of $Li_2O:SiO_2:B_2O_3$ of 70.8 mol %:16.7 mol %:12.5 mol % and then melted by heating in the air. Subsequently, the melt was rapidly cooled using a twin roller to form an about 0.5 mm-thick sheet (cullet)-like solid electrolyte precursor. Subsequently, the solid electrolyte precursor was annealed in the temperature range of 25 to 550° C. for 5 minutes to form a sheet-like solid electrolyte.

Comparative Examples 7-1 to 7-8

Solid electrolytes were obtained similarly to Examples 6-1 to 6-3 and Comparative Examples 6-1 to 6-5, except that a pressing method was used instead of the twin roller method.

(Evaluation)

The solid electrolytes obtained as described above were used as evaluation samples and evaluated as described below. Note that in the X-ray diffraction measurement, each sheet-like sample was ground in, for example, a ball mill or an agate mortar and then subjected to the measurement. In addition, in the measurement of Raman spectrum and ionic conductivity, each sheet-like sample was directly subjected to the measurement without being ground.

(Raman Spectroscopy)

The Raman spectrum of each evaluation sample was measured. Subsequently, in the measured Raman spectrum, the intensity of a peak X (a peak belonging to the $BO_3^{3-}$ structure) and the intensity of a peak Y (a peak belonging to the $B_2O_5^{4-}$ structure) were determined, from which the peak area intensity ratio X/Y was calculated, and the structure of the evaluation sample was identified. The results are shown in Table 4 and FIG. 17. In addition, FIG. 18A shows the Raman spectrum of the solid electrolyte (solid electrolyte precursor) obtained before the annealing in Example 6-1, and FIGS. 18B and 18C show the Raman spectra of the solid electrolytes of Examples 6-1 and 6-3, respectively.

(Ionic Conductivity)

The ionic conductivity of each evaluation sample was measured similarly to Example 1-1. The results are shown in Table 3.

(X-Ray Diffraction)

The X-ray diffraction spectrum of each evaluation sample was measured using CuKα as a ray source, and the structure of the evaluation sample was identified on the basis of the measurement result. The results are shown in Table 4. Note that the measurement was performed using SmartLab (3 kw) manufactured by Rigaku Corporation.

Table 4 shows the results of the evaluation of the evaluation samples.

TABLE 4

| | Raw materials | | | | Annealing | | | Raman | Ionic |
| | $Li_2O$ [mol %] | $SiO_2$ [mol %] | $B_2O_3$ [mol %] | Production method | Temperature [° C.] | Time [h] | X/Y | evaluation results | conductivity [S/cm] |
|---|---|---|---|---|---|---|---|---|---|
| Comparative Example 6-1 | 70.8 | 16.7 | 12.5 | Twin roller method | 25 | 5 | 1.8 | Glass | $5.8 \times 10^{-6}$ |
| Comparative Example 6-2 | | | | | 100 | 5 | 1.7 | Glass | |
| Comparative Example 6-3 | | | | | 200 | 5 | 1.7 | Glass | |
| Comparative Example 6-4 | | | | | 300 | 5 | 1.7 | Glass | |
| Example 6-1 | | | | | 380 | 5 | 2.2 | Glass-ceramic | $1.3 \times 10^{-5}$ |
| Example 6-2 | | | | | 400 | 5 | 2.2 | Glass-ceramic | |
| Example 6-3 | | | | | 460 | 5 | 2.4 | Glass-ceramic | |
| Comparative Example 6-5 | | | | | 550 | 5 | 1.8 | Crystal | $7.0 \times 10^{-11}$ |

TABLE 4-continued

| | Raw materials | | | | Annealing | | | Raman | Ionic |
| | Li$_2$O [mol %] | SiO$_2$ [mol %] | B$_2$O$_3$ [mol %] | Production method | Temperature [° C.] | Time [h] | X/Y | evaluation results | conductivity [S/cm] |
|---|---|---|---|---|---|---|---|---|---|
| Comparative Example 7-1 | 70.8 | 16.7 | 12.5 | Pressing method | 25 | 5 | 1.2 | Glass | 8.2 × 10$^{-6}$ |
| Comparative Example 7-2 | | | | | 100 | 5 | 1.2 | Glass | |
| Comparative Example 7-3 | | | | | 200 | 5 | 1.1 | Glass | |
| Comparative Example 7-4 | | | | | 300 | 5 | 1.1 | Glass | |
| Comparative Example 7-5 | | | | | 380 | 5 | 1.1 | Glass | 5.9 × 10$^{-6}$ |
| Comparative Example 7-6 | | | | | 400 | 5 | 1.1 | Glass | |
| Comparative Example 7-7 | | | | | 460 | 5 | 1.1 | Glass | |
| Comparative Example 7-8 | | | | | 550 | 5 | 0.7 | Crystal | 12 × 10$^{-9}$ |

At least two peaks derived from crystal structure were detected in the ranges 20°≤2θ≤25° and 25°<2θ≤30°, respectively, in the X-ray diffraction spectra of the solid electrolytes (glass-ceramic) of Examples 6-1 to 6-3. At least two peaks derived from crystal structure were also detected in the ranges 20°≤2θ≤25° and 25°<2θ≤30°, respectively, in the X-ray diffraction spectra of the solid electrolytes (crystal) of Comparative Examples 6-5 and 7-8. On the other hand, at least two peaks derived from crystal structure were not detected in the ranges 20°≤2θ≤25° and 25°<2θ≤30°, respectively, in the X-ray diffraction spectra of the solid electrolytes (glass) of Comparative Examples 6-1 to 6-4 and 7-1 to 7-7.

Note that for the samples of Comparative Examples 7-1 to 7-8 prepared using the pressing method, at least two peaks derived from crystal structure were not detected in the ranges 20°≤2θ≤25° and 25°<2θ≤30°, respectively, even when the solid electrolytes were obtained in the form of glass-ceramics by controlling the annealing conditions. Although it is not clear why the peaks were not detected for the solid electrolytes prepared using the pressing method even when they were in the form of glass-ceramics, it is conceivable that there may be a difference in the structure of glass or crystal in the glass-ceramic between the solid electrolytes prepared using the twin roller method and the pressing method. It is also conceivable that this structural difference may be a cause of the difference in ionic conductivity characteristics.

Figure 18:
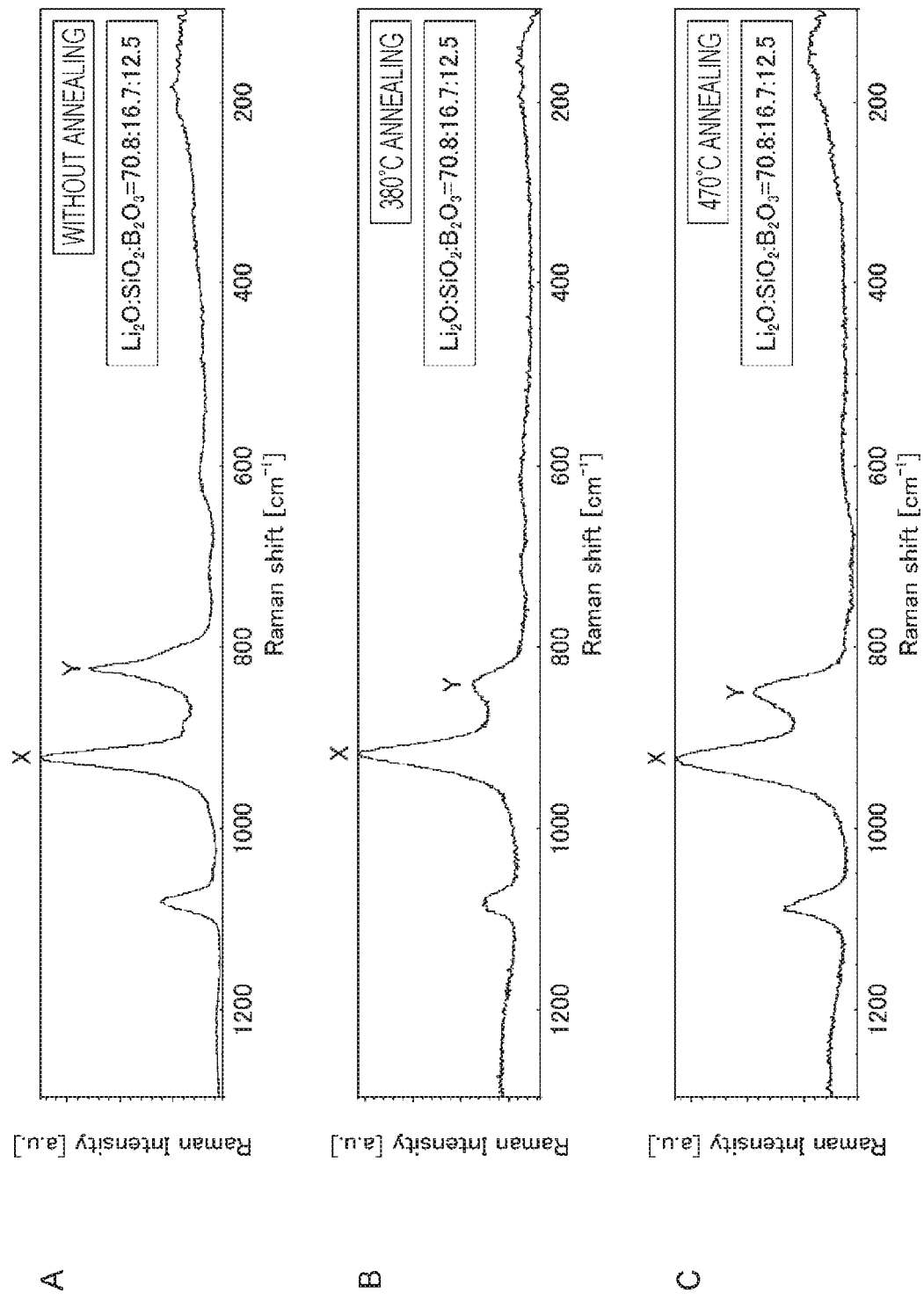
FIG. 18A is a graph showing the results of measurement of the Raman spectrum of the evaluation sample of Example 6-1 before annealing.
FIG. 18B is a graph showing the results of measurement of the Raman spectrum of Example 6-1.
FIG. 18C is a graph showing the results of measurement of the Raman spectrum of Example 6-3.

FIG. 18 shows the following.

The low temperature (380° C.)-heated solid electrolyte with improved ionic conductivity has a peak area intensity ratio X/Y higher than that of the high temperature (470° C.)-heated solid electrolyte with reduced ionic conductivity.

Figure 17:
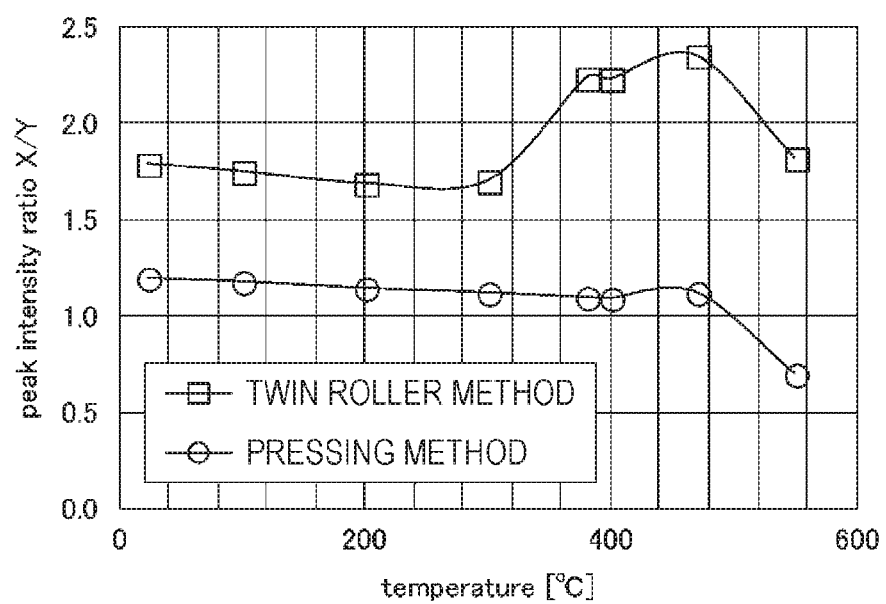
FIG. 17 is a graph showing the temperature dependence of the peak area intensity ratio X/Y calculated from the Raman spectra of the evaluation samples of Examples 6-1 to 6-3 and Comparative Examples 6-1 to 6-5 and 7-1 to 7-8.

FIG. 17 and Table 4 show the following.

Even with the same raw material for the solid electrolyte, differences in the peak area intensity ratio X/Y occur depending on the production method. Specifically, an increase in the peak area intensity ratio X/Y is observed for the solid electrolyte prepared by the twin roller method, whereas no increase in the peak area intensity ratio X/Y is observed for the solid electrolyte prepared by the pressing method. In addition, only the solid electrolytes prepared by the twin roller method improve in ionic conductivity when undergoing low-temperature heating in the range of 380 to 460° C.

<vii Evaluation of Main Peak Width of Raman Spectrum>

Example 8-1

First, Li$_2$O, SiO$_2$, and B$_2$O$_3$ were mixed in a molar ratio of Li$_2$O:SiO$_2$:B$_2$O$_3$ of 68 mol %:12 mol %:20 mol % and then melted by heating in the air. Subsequently, the melt was rapidly cooled using a twin roller to form an about 0.5 mm-thick sheet (cullet)-like solid electrolyte precursor. Subsequently, the solid electrolyte precursor was annealed in a temperature range of 380° C. for 2 hours to form a sheet-like solid electrolyte.

Comparative Example 8-1

A solid electrolyte was obtained similarly to Example 8-1, except that the precursor annealing conditions were 500° C. for 2 hours.

Comparative Example 8-2

A solid electrolyte precursor was obtained by performing the process before the annealing similarly to Example 8-1.

Example 9-1

Li$_2$O, SiO$_2$, and B$_2$O$_3$ were mixed in a molar ratio of Li$_2$O:SiO$_2$:B$_2$O$_3$ of 65 mol %:10 mol %:25 mol %. In addition, the precursor annealing conditions were 380° C. for 2 hours. A solid electrolyte was obtained similarly to Example 8-1, except for the above.

Comparative Example 9-2

A solid electrolyte was obtained similarly to Example 9-1, except that the precursor annealing conditions were 500° C. for 2 hours.

Comparative Example 9-2

A solid electrolyte precursor was obtained by performing the process before the annealing similarly to Example 9-1.

Example 10-1

Li$_2$O, SiO$_2$, and B$_2$O$_3$ were mixed in a molar ratio of Li$_2$O:SiO$_2$:B$_2$O$_3$ of 54 mol %:15 mol %:31 mol %. In addition, the precursor annealing conditions were 440° C.

for 2 hours. A solid electrolyte was obtained similarly to Example 8-1, except for the above.

Comparative Example 10-1

A solid electrolyte was obtained similarly to Example 10-1, except that the precursor annealing conditions were 500° C. for 2 hours.

Comparative Example 10-2

A solid electrolyte precursor was obtained by performing the process before the annealing similarly to Example 10-1.

Example 11-1

$Li_2O$, $SiO_2$, and $B_2O_3$ were mixed in a molar ratio of $Li_2O$:$SiO_2$:$B_2O_3$ of 54 mol %:13 mol %:33 mol %. In addition, the precursor annealing conditions were 440° C. for 2 hours. A solid electrolyte was obtained similarly to Example 8-1, except for the above.

Comparative Example 11-1

A solid electrolyte was obtained similarly to Example 11-1, except that the precursor annealing conditions were 500° C. for 2 hours.

Comparative Example 11-2

A solid electrolyte precursor was obtained by performing the process before the annealing similarly to Example 11-1.

Example 12-1

$Li_2O$, $SiO_2$, and $B_2O_3$ were mixed in a molar ratio of $Li_2O$:$SiO_2$:$B_2O_3$ of 54 mol %:11 mol %:35 mol %. In addition, the precursor annealing conditions were 440° C. for 2 hours. A solid electrolyte was obtained similarly to Example 8-1, except for the above.

Comparative Example 12-1

A solid electrolyte was obtained similarly to Example 12-1, except that the precursor annealing conditions were 500° C. for 2 hours.

Comparative Example 12-2

A solid electrolyte precursor was obtained by performing the process before the annealing similarly to Example 12-1.

Example 13-1

$Li_2O$, $SiO_2$, and $B_2O_3$ were mixed in a molar ratio of $Li_2O$:$SiO_2$:$B_2O_3$ of 50 mol %:11 mol %:39 mol %. In addition, the precursor annealing conditions were 460° C. for 2 hours. A solid electrolyte was obtained similarly to Example 8-1, except for the above.

Comparative Example 13-1

A solid electrolyte was obtained similarly to Example 13-1, except that the precursor annealing conditions were 520° C. for 2 hours.

Comparative Example 13-2

A solid electrolyte precursor was obtained by performing the process before the annealing similarly to Example 13-1.
(Evaluation)

The solid electrolytes and the solid electrolyte precursors obtained as described above were used as evaluation samples and evaluated as described below. Note that in the X-ray diffraction measurement, each sheet-like sample was ground in, for example, a ball mill or an agate mortar and then subjected to the measurement. In addition, in the measurement of Raman spectrum and ionic conductivity, each sheet-like sample was directly subjected to the measurement without being ground.
(Raman Spectroscopy)

Figure 19:
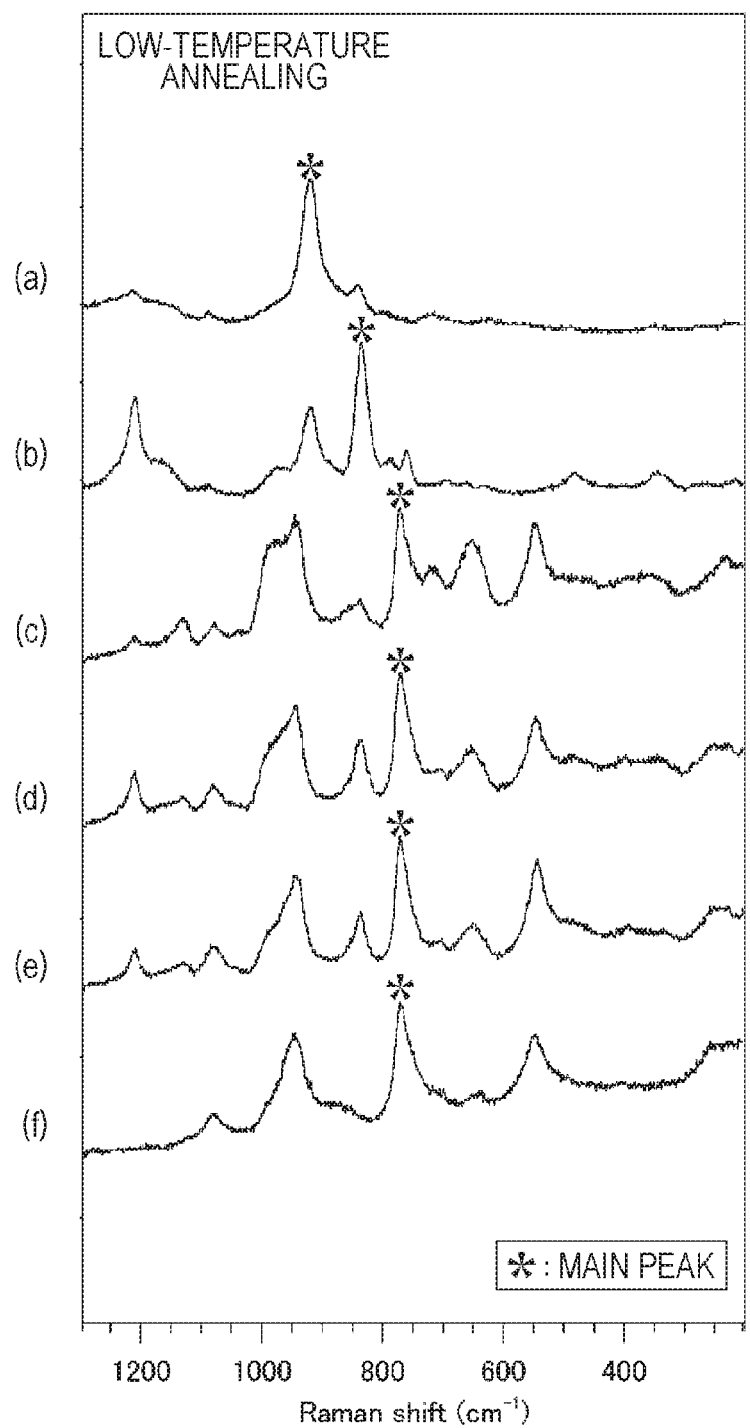
FIG. 19 is a graph showing the Raman spectra of the evaluation samples of Examples 8-1, 9-1, 10-1, 11-1, 12-1, and 13-1.
Figure 20:
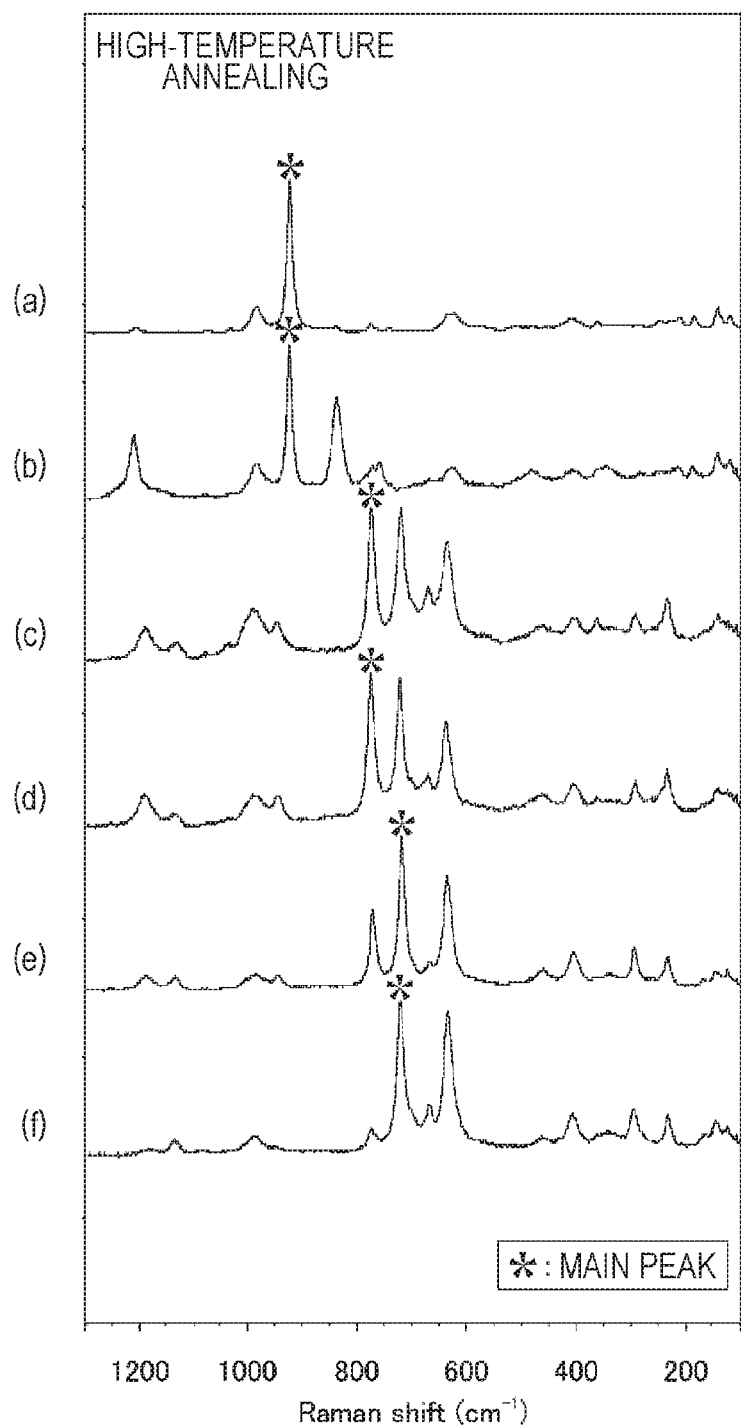
FIG. 20 is a graph showing the Raman spectra of the evaluation samples of Comparative Examples 8-1, 9-1, 10-1, 11-1, 12-1, and 13-1.

First, the Raman spectrum of each evaluation sample was measured. The measurement results are shown in FIGS. 19 and 20. Subsequently, the full width at half maximum (FWHM) of the main peak was determined among peaks appearing in the Raman shift region of 500 to 1,000 cm$^{-1}$. The results are shown in Table 5 and FIG. 21. In this regard, the full width at half maximum was calculated by Gaussian fitting.
(X-Ray Diffraction)

The X-ray diffraction spectrum of each evaluation sample was measured using CuKα as a ray source, and the structure of the evaluation sample was identified on the basis of the measurement result. The results are shown in Table 5. Note that the measurement was performed using SmartLab (3 kw) manufactured by Rigaku Corporation.
(Ionic Conductivity)

The ionic conductivity of each evaluation sample was measured similarly to Example 1-1. The results are shown in Table 5.

Table 5 shows the results of the evaluation of the evaluation samples.

TABLE 5

| | Raw materials | | | Annealing | | | Main peak full | XRD | Ionic |
|---|---|---|---|---|---|---|---|---|---|
| | $Li_2O$ [mol %] | $SiO_2$ [mol %] | $B_2O_3$ [mol %] | Temperature [° C.] | Time [h] | Spectrum | width at half maximum | evaluation results | conductivity [S/cm] |
| Example 8-1 | 68 | 12 | 20 | 380 | 2 | FIG. 17(a) | 33.6 | Glass-ceramic | 3.6 × 10$^{-6}$ |
| Comparative Example 8-1 | | | | 500 | 2 | FIG. 18(a) | 13.1 | Crystal | n.d. |
| Comparative Example 8-2 | | | | — | — | — | — | Glass | 2.4 × 10$^{-6}$ |
| Example 9-1 | 65 | 10 | 25 | 380 | 2 | FIG. 17(b) | 25.2 | Glass-ceramic | 1.7 × 10$^{-6}$ |
| Comparative Example 9-1 | | | | 500 | 2 | FIG. 18(b) | 12.5 | Crystal | n.d. |
| Comparative Example 9-2 | | | | — | — | — | — | Glass | 1.5 × 10$^{-6}$ |

TABLE 5-continued

|  | Raw materials | | | Annealing | | | Main peak full width at half maximum | XRD evaluation results | Ionic conductivity [S/cm] |
| --- | --- | --- | --- | --- | --- | --- | --- | --- | --- |
|  | Li$_2$O [mol %] | SiO$_2$ [mol %] | B$_2$O$_3$ [mol %] | Temperature [° C.] | Time [h] | Spectrum |  |  |  |
| Example 10-1 | 54 | 15 | 31 | 440 | 2 | FIG. 17(c) | 39.9 | Glass-ceramic | 4.7 × 10$^{-7}$ |
| Comparative Example 10-1 |  |  |  | 500 | 2 | FIG. 18(c) | 17.4 | Crystal | n.d. |
| Comparative Example 10-2 |  |  |  | — | — | — | — | Glass | 4.5 × 10$^{-7}$ |
| Example 11-1 | 54 | 13 | 33 | 440 | 2 | FIG. 17(d) | 27.6 | Glass-ceramic | 8.5 × 10$^{-7}$ |
| Comparative Example 11-1 |  |  |  | 500 | 2 | FIG. 18(d) | 16.7 | Crystal | n.d. |
| Comparative Example 11-2 |  |  |  | — | — | — | — | Glass | 7.3 × 10$^{-7}$ |
| Example 12-1 | 54 | 11 | 35 | 440 | 2 | FIG. 17(e) | 22.4 | Glass-ceramic | 8.7 × 10$^{-7}$ |
| Comparative Example 12-1 |  |  |  | 500 | 2 | FIG. 18(e) | 13.4 | Crystal | n.d. |
| Comparative Example 12-2 |  |  |  | — | — | — | — | Glass | 6.4 × 10$^{-7}$ |
| Example 13-1 | 50 | 11 | 39 | 460 | 2 | FIG. 17(f) | 22.8 | Glass-ceramic | 5.8 × 10$^{-7}$ |
| Comparative Example 13-1 |  |  |  | 520 | 2 | FIG. 18(f) | 14.7 | Crystal | n.d. |
| Comparative Example 13-2 |  |  |  | — | — | — | — | Glass | 4.3 × 10$^{-7}$ | n.d.: Not Detected

Note that at least two peaks derived from crystal structure were detected in the ranges $20°≤2θ≤25°$ and $25°<2θ≤30°$, respectively, in the X-ray diffraction spectra of the solid electrolytes (glass-ceramic) of Examples 8-1, 9-1, 10-1, 11-2, 12-1, and 13-1. At least two peaks derived from crystal structure were also detected in the ranges $20°≤2θ≤25°$ and $25°<2θ≤30°$, respectively, in the X-ray diffraction spectra of the solid electrolytes (crystal) of Comparative Examples 8-1, 9-1, 10-1, 11-2, 12-1, and 13-1. On the other hand, at least two peaks derived from crystal structure were not detected in the ranges $20°≤2θ≤25°$ and $25°<2θ≤30°$, respectively, in the X-ray diffraction spectra of the solid electrolytes (glass) of Comparative Examples 8-2, 9-2, 10-2, 11-2, 12-2, and 13-2.

Figure 21:
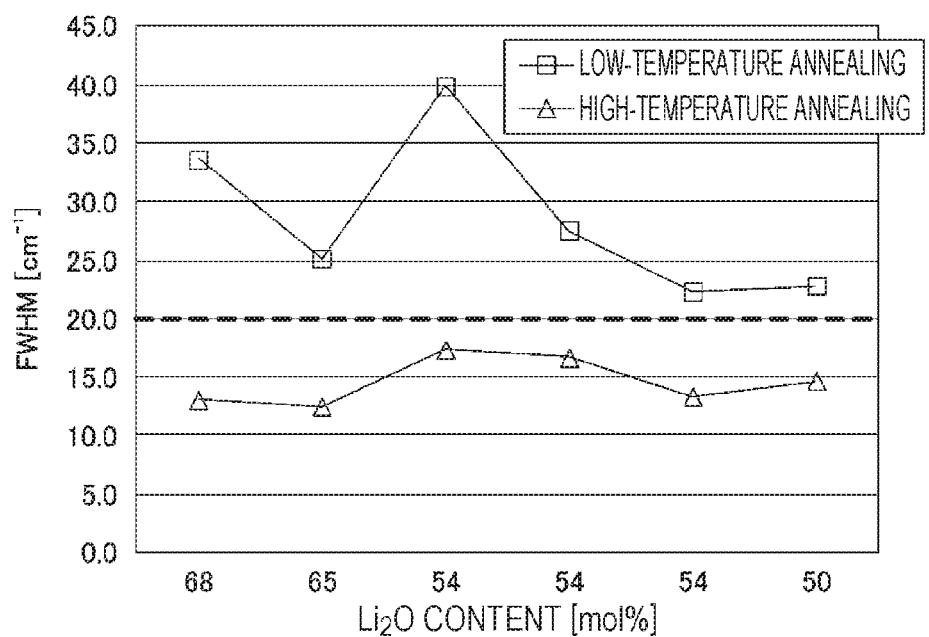
FIG. 21 is a graph showing the full widths at half maximum of the main peaks of the Raman spectra of the evaluation samples of Examples 8-1, 9-1, 10-1, 11-1, 12-1, and 13-1 and Comparative Examples 8-1, 9-1, 10-1, 11-1, 12-1, and 13-1.

FIGS. 19 to 21 and Table 5 show the following.

The solid electrolytes having undergone low-temperature annealing (380° C. to 460° C.) have a full width at half maximum of 20 or more, whereas the solid electrolytes having undergone high-temperature annealing (500° C. to 520° C.) have a full width at half maximum of less than 20.

The solid electrolytes with a full width at half maximum of 20 or more have improved ionic conductivity resulting from annealing, whereas the solid electrolytes with a full width at half maximum of less than 20 have reduced ionic conductivity resulting from annealing.

<viii NMR Evaluation>

Example 14-1

First, Li$_2$O, SiO$_2$, and B$_2$O$_3$ were mixed in a molar ratio of Li$_2$O:SiO$_2$:B$_2$O$_3$ of 54 mol %:11 mol %:35 mol % and then melted by heating in the air. Subsequently, the melt was rapidly cooled using a twin roller to form a solid electrolyte precursor. Subsequently, the solid electrolyte precursor was annealed in a temperature range of 440° C. for 2 hours to form a solid electrolyte.

Comparative Example 14-1

A solid electrolyte was obtained similarly to Example 14-1, except that the solid electrolyte precursor annealing conditions were changed to 500° C. for 2 hours.

Comparative Example 14-2

A solid electrolyte precursor was obtained by performing the process before the annealing similarly to Example 14-1.

(Evaluation)

The solid electrolytes and the solid electrolyte precursors obtained as described above were used as evaluation samples and evaluated as described below. Note that, in the X-ray diffraction measurement and NMR measurement, each sheet-like sample was ground in, for example, a ball mill or an agate mortar and then subjected to the measurement. In addition, in the ionic conductivity measurement, each sheet-like sample was directly subjected to the measurement without being ground.

(X-Ray Diffraction)

Each evaluation sample was subjected to X-ray diffraction using CuKα as a ray source and measured for X-ray diffraction spectrum. The structure of each evaluation sample was identified on the basis of the measurement result. The results are shown in Table 7. Note that the measurement was performed using SmartLab (3 kw) manufactured by Rigaku Corporation.

(Ionic Conductivity)

The ionic conductivity of each evaluation sample was measured similarly to Example 1-1. The results are shown in Table 7.

($^7$Li-NMR)

Figure 22:
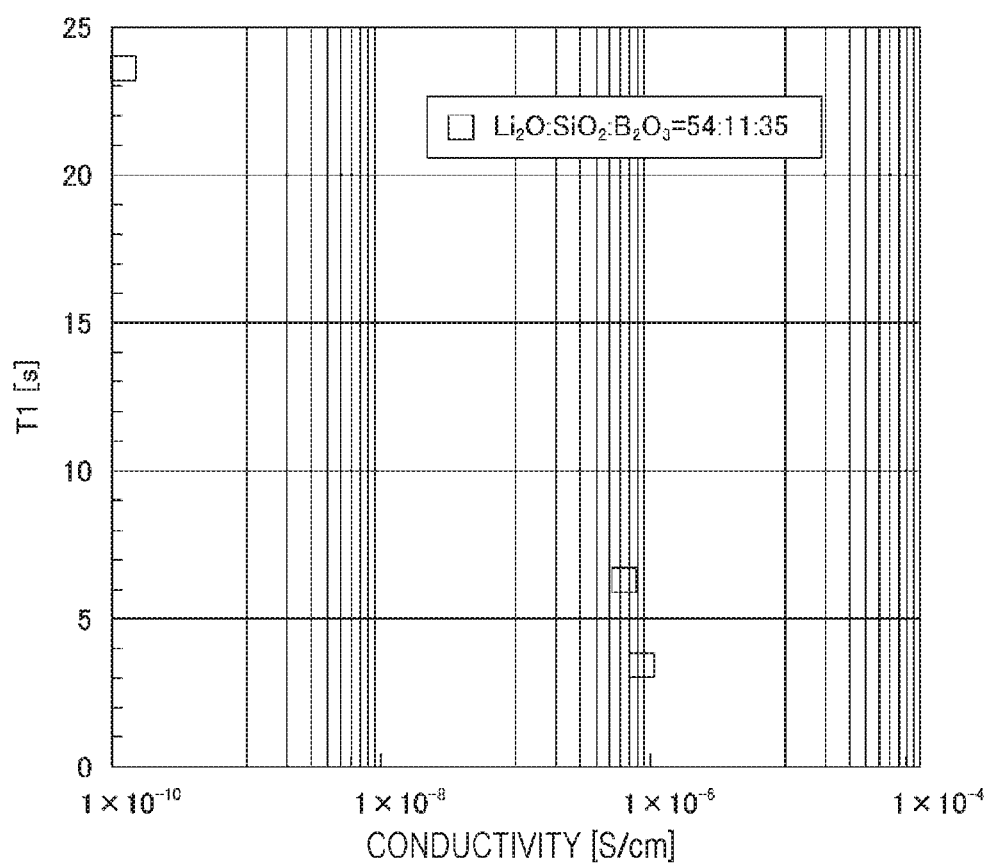
FIG. 22 is a graph showing the relationship between the $^7$Li-NMR T1 value and the conductivity of the evaluation samples of Example 14-1 and Comparative Examples 14-1 and 14-2.

The $^7$Li nuclear spin-lattice relaxation time T1 and chemical shift of each solid electrolyte were determined by solid-state high-resolution nuclear magnetic resonance method (NMR method). The results are shown in Table 7. FIG. 22 also shows the relationship between $^7$Li nuclear spin-lattice relaxation time T1 and ionic conductivity. The measurement was performed by a single-pass method under the conditions shown in Table 6 using a system having a combination of a 4 mmφ MAS prove manufactured by Doty Scientific and ECA700 Delta2 NMR (manufactured by JEOL RESONANCE Inc.) in RIKEN Yokohama Branch. The sample rotor used was made of silicon nitride.

Table 6 shows the $^7$Li solid-state NMR measurement conditions.

TABLE 6

| Nuclide | Measurement frequency [MHz] | Pulse width [μs] | Measurement width [kHz] | MAS rotational frequency [kHz] | External standard |
|---|---|---|---|---|---|
| $^7$Li (S = 3/2) | 272.29 | 3.0 (90°) | 50 | 10 | LiCl aq (0 ppm) |

Table 7 shows the results of the evaluation of the evaluation samples.

TABLE 7

| | Raw materials | | | Annealing | | NMR | | XRD | Ionic |
|---|---|---|---|---|---|---|---|---|---|
| | Li$_2$O [mol %] | SiO$_2$ [mol %] | B$_2$O$_3$ [mol %] | Temperature [° C.] | Time [h] | shift [ppm] | T1 [s] | evaluation results | conductivity [S/cm] |
| Example 14-1 | 54 | 11 | 35 | 440 | 2 | 0.17 | 3.44 | Glass-ceramic | 8.7 × 10$^{-7}$ |
| Comparative Example 14-1 | | | | 500 | 2 | 0.44 | 23.6 | Crystal | n.d. |
| Comparative Example 14-2 | | | | — | — | 0.30 | 6.30 | Glass | 6.4 × 10$^{-7}$ | n.d.: Not Detected

Note that at least two peaks derived from crystal structure were detected in the ranges 20°≤2θ≤25° and 25°<2θ≤30°, respectively, in the X-ray diffraction spectrum of the solid electrolyte (glass-ceramic) of Example 14-1. At least two peaks derived from crystal structure were also detected in the ranges 20°≤2θ≤25° and 25°<2θ≤30°, respectively, in the X-ray diffraction spectrum of the solid electrolyte (crystal) of Comparative Example 14-1. On the other hand, at least two peaks derived from crystal structure were not detected in the ranges 20°≤2θ≤25° and 25°<2θ≤30°, respectively, in the X-ray diffraction spectrum of the solid electrolyte (glass) of Comparative Example 14-2.

The results of the evaluation described above show the following.

In the $^7$Li-NMR spectrum, a broad signal with a full width at half maximum of about 1 kHz was observed for every sample. The chemical shift values of the observed signals were within a width of 0.1 to 0.5 ppm with no significant difference between them. On the other hand, the T1 value of the signal was found to have a significant tendency. The T1 value (longitudinal relaxation, spin-lattice relaxation time) contains information about the motion state of the atom or ion (the motion state refers to the movement (lattice vibration) at a certain lattice cite, which differs from translation movement, but there is a correlation between both movements.). In a series of samples considered to be similar in Li nuclear magnetic environment, such as those in this series, a smaller T1 value (higher relaxation efficiency) suggests higher mobility, while a larger T1 value suggests lower mobility. Table 7 shows that the low-temperature annealing results in a smaller T1 value. This means higher mobility of Li ions. On the other hand, the high-temperature annealing results in a larger T1 value, which suggests a reduction in the mobility of Li ions.

It was observed by the $^7$Li-NMR T1 measurement that for the samples of Example 14-1 and Comparative Examples 14-1 and 14-2, the mobility of Li ions increased after the low-temperature annealing but decreased after the high-temperature annealing. This agrees with the tendency that the conductivity increases after the low-temperature annealing and decreases after the high-temperature annealing.

It is suggested from FIG. 22 that a linear relationship should be established between $^7$Li-NMR T1 value and conductivity. This suggests that the conductivity (a macroscopic nature of material) will reflect the mobility of Li ions (a microscopic parameter). Therefore, the T1 value would be an effective parameter for defining this material system. Specifically, the T1 value would preferably be 6 seconds or less, more preferably 5 seconds or less, even more preferably 3 seconds or less.

<ix Evaluation of Compressed Fired Solid Electrolytes>

Examples 15-1 to 15-4

First, Li$_2$O, SiO$_2$, and B$_2$O$_3$ were mixed in a molar ratio of Li$_2$O:SiO$_2$:B$_2$O$_3$ of 54 mol %:11 mol %:35 mol % and then melted by heating in the air. Subsequently, the melt was rapidly cooled using a twin roller to forma solid electrolyte precursor (in a similar manner as Example 2-1). Subsequently, the solid electrolyte precursor was ground in a ball mill to form a solid electrolyte precursor powder. Subsequently, the solid electrolyte precursor powder was compressed and fired for 10 minutes at the temperature and pressure shown in Table 8 using a hot press, so that a pellet-like solid electrolyte was obtained as a compressed fired material.

Reference Examples 15-1 and 15-2

Solid electrolyte powders were obtained similarly to Examples 15-1 and 15-2. Subsequently, the solid electrolyte powders were fired for 120 minutes at the temperatures shown in Table 8, so that pellet-like solid electrolytes were obtained as fired materials.

(Evaluation)

The solid electrolytes obtained as described above were used as evaluation samples and evaluated as described below. Note that, in the X-ray diffraction measurement, each pellet-like sample was ground in, for example, a ball mill or an agate mortar and then subjected to the measurement. In addition, in the ionic conductivity measurement, each pellet-like sample was directly subjected to the measurement without being ground.

(X-Ray Diffraction)

Figure 23:
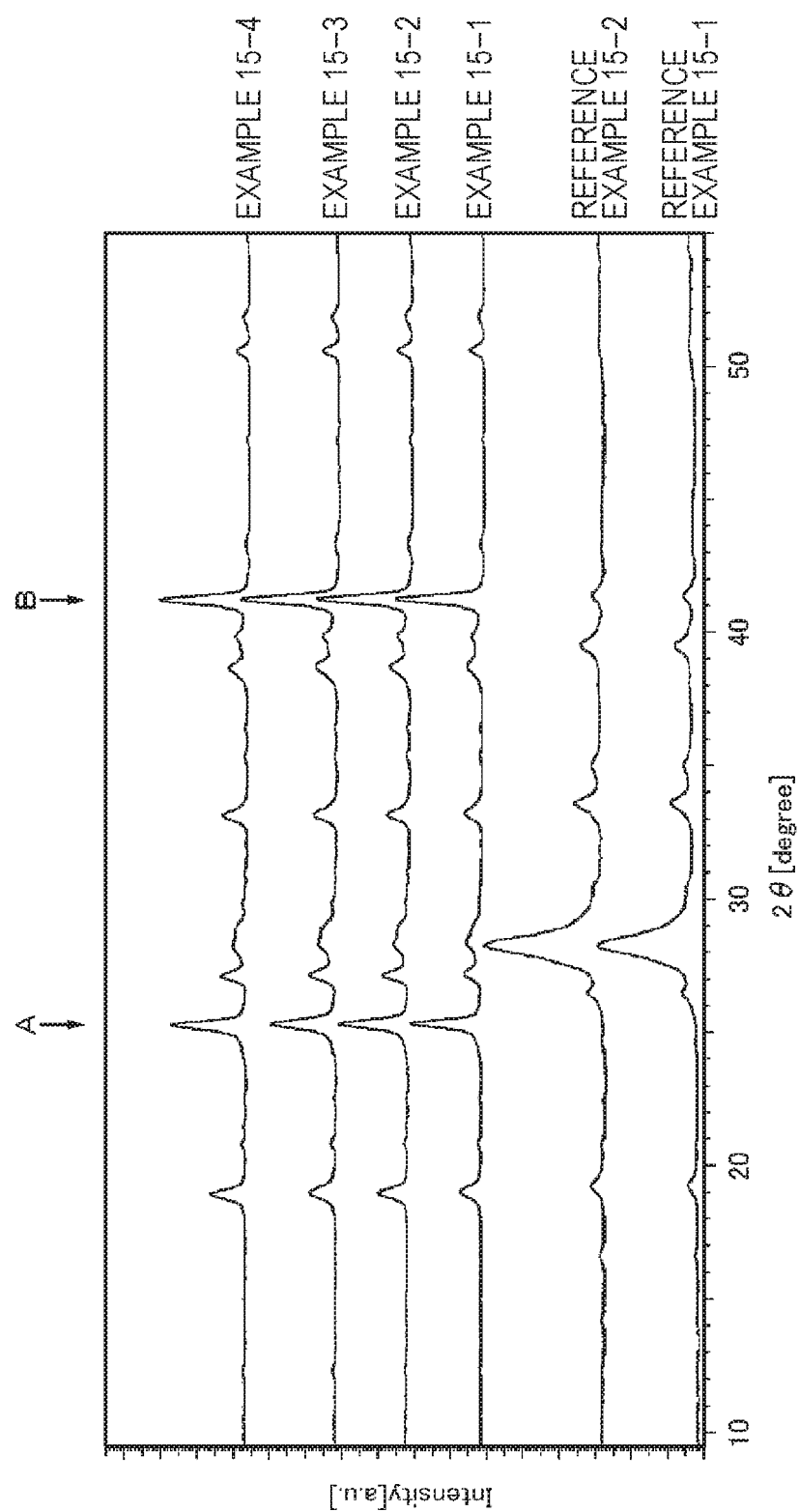
FIG. 23 is a graph showing the results of measurement of the X-ray diffraction spectra of the evaluation samples of Examples 15-1 to 15-4 and Reference Examples 15-1 and 15-2.

First, each evaluation sample was subjected to X-ray diffraction using CuKα as a ray source and measured for X-ray diffraction spectrum. The results are shown in FIG. 23. Note that the measurement was performed using D8 DISCOVER manufactured by Bruker Corporation. Subsequently, the ratio A/B of the intensity of the peak A to the intensity of the peak B was determined from the measured X-ray diffraction spectrum. The results are shown in Table 8.

(Ionic Conductivity)

The ionic conductivity of the solid electrolytes was measured similarly to Example 1-1. The results are shown in Table 8.

Table 8 shows the results of the evaluation of the samples.

TABLE 8

|  | Firing conditions | Peak intensity ratio A/B | Ionic conductivity [S/cm] |
|---|---|---|---|
| Example 15-1 | Compression and firing at 430° C. and 6 N/mm² (hot pressing) | 0.847 | $7.9 \times 10^{-10}$ |
| Example 15-2 | Compression and firing at 430° C. and 21 N/mm² (hot pressing) | 0.785 | $7.6 \times 10^{-10}$ |
| Example 15-3 | Compression and firing at 430° C. and 70 N/mm² (hot pressing) | 0.702 | $9.6 \times 10^{-10}$ |
| Example 15-4 | Compression and firing at 450° C. and 21 N/mm² (hot pressing) | 0.872 | $8.3 \times 10^{-10}$ |
| Reference Example 15-1 | Firing at 430° C. (without hot pressing) | — | $8.0 \times 10^{-11}$ |
| Reference Example 15-2 | Firing at 450° C. (without hot pressing) | — | $2.7 \times 10^{-11}$ |

FIG. 23 shows the following.

There is a difference in X-ray diffraction pattern between the compressed fired (hot-pressed) solid electrolyte and the solid electrolyte having undergone only firing (without compression). Specifically, the compressed fired solid electrolyte has an X-ray diffraction spectrum with both the peak A appearing in the range $25° \leq 2\theta \leq 26°$ and the peak B appearing in the range $41° \leq 2\theta \leq 42°$. On the other hand, the solid electrolyte having undergone only firing does not have the peak A and has a very low intensity of a peak at a position almost similar to that of the peak B. Therefore, there is a difference in crystal structure between the compressed fired solid electrolyte and the solid electrolyte having undergone only firing.

Table 8 shows the following.

The compressed fired solid electrolyte has a ratio A/B of the intensity of the peak A to the intensity of the peak B in the range of 0.5 to 2.

All the solid electrolytes of Examples 15-1 to 15-4 and Reference Examples 15-1 and 15-2 are synthesized with the same composition and conditions as those for the solid electrolyte of Example 5-1 until the intermediate stage of the process. However, the solid electrolyte of Example 5-1 in the form of a sheet is directly subjected to the ionic conductivity measurement, whereas the ionic conductivity measurement for all the solid electrolytes of Examples 15-1 to 15-4 and Reference Examples 15-1 and 15-2 is performed on the product obtained by grinding the solid electrolyte precursor (glass) once and then compacting and molding the powder, in order to examine the effect of compression and firing. Therefore, the measured ionic conductivities of the solid electrolytes of Examples 15-1 to 15-4 and Reference Examples 15-1 and 15-2 are all lower than the ionic conductivity of the solid electrolyte of Comparative Example 5-1.

Under the circumstances, however, the ionic conductivities of the compressed fired solid electrolytes of Examples 15-1 to 15-4 are higher than those of the solid electrolytes of Reference Examples 15-1 and 15-2 having undergone only firing. Specifically, the ionic conductivities of the compressed fired solid electrolytes of Examples 15-1 to 15-4 are at least 10 times higher than those of the solid electrolytes of Reference Examples 15-1 and 15-2 having undergone only firing. The difference in ionic conductivity would be because of the difference in crystal structure between the compressed fired solid electrolyte and the solid electrolyte having undergone only firing.

<x Evaluation of Compressed Fired Electrodes>

Example 16-1

[Preparation of Solid Electrolyte Pellet]

First, a $Li_6BaLa_2Ta_2O_{12}$ powder was formed into a pellet with a diameter of 13 mmφ. The particles in the pellet were bonded together by firing at 1,000° C. for 8 hours. Subsequently, the thickness of the pellet was reduced to 1 mm by polishing both sides of the pellet. In this way, a solid electrolyte substrate was formed.

[Step of Preparing Positive Electrode Slurry and Forming Positive Electrode]

First, 1.5 g of LCO (manufactured by Sigma-Aldrich Co.) as a positive electrode active material, 3 g of a solid electrolyte also serving as a glass binding agent, 1.07 g of an acrylic binder as a thickener, and 6.25 g of terpineol were weighed and then stirred to form a slurry. Note that the content of the positive electrode active material was adjusted to 50% by weight based on the weight of the solid electrolyte. The solid electrolyte used was the solid electrolyte ($Li_2O$—$SiO_2$—$B_2O_3$) powder of Example 15-1 before the hot pressing. Subsequently, the slurry was applied to a 6 mmφ area of the solid electrolyte substrate by screen printing and then dried at 100° C. to form a positive electrode precursor. Subsequently, a collector Ni foil was bonded onto the positive electrode precursor, and then they were compressed and fired at 70 N/mm² and 430° C. for 10 minutes by hot pressing to form a positive electrode.

[Assembling all-Solid-State Battery]

A Li/Cu metal foil was bonded as a negative electrode to the substrate surface opposite to the positive electrode and then subjected to cold isostatic pressing under the conditions of a pressure of 200 MPa to form a negative electrode. As a result, the desired battery (all-solid-state lithium ion secondary battery) was obtained.

Reference Example 16-1

A battery was obtained similarly to Example 16-1, except that a collector Ni foil was bonded onto the positive electrode precursor and then fired at 430° C. for 10 minutes in the step of preparing the positive electrode slurry and forming the positive electrode.

(Evaluation)

The battery obtained as described above was used as an evaluation sample and evaluated as described below.

(Observation of Electrode Section)

Figure 24:
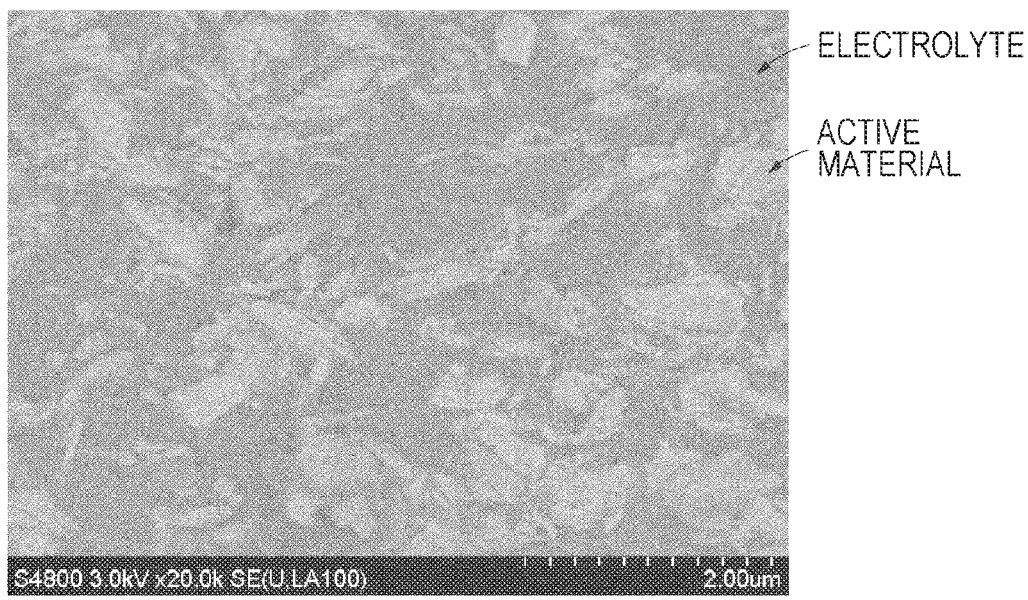
FIG. 24A shows a cross-sectional SEM image of the positive electrode of Example 16-1.
FIG. 24B shows a cross-sectional SEM image of the positive electrode of Reference Example 16-1.
Figure 24:
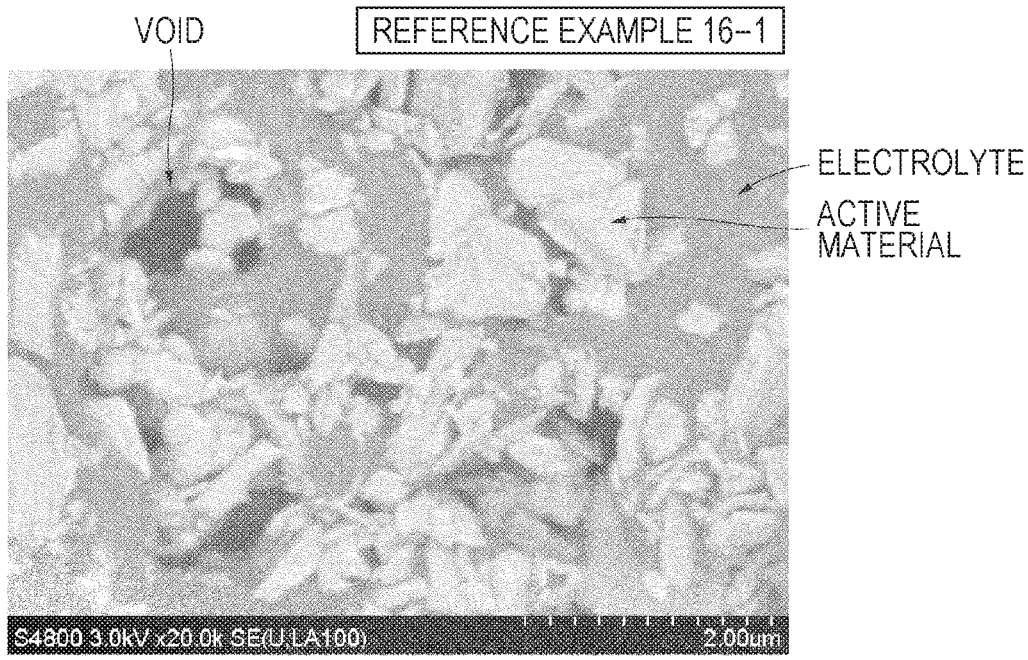

A photograph of the section of the evaluation sample was taken using a scanning electron microscope (SEM). The results are shown in FIG. 24A (Example 16-1) and FIG. 24B (Reference Example 16-1).

(Charge-Discharge Measurement)

The battery was charged and discharged under the conditions below when an initial charge-discharge curve, an initial charge-discharge capacity, an initial charge-discharge efficiency, and cycle characteristics were determined. The results are shown in Table 9 and FIGS. 25A and 25B.

Measurement environment conditions: dry air atmosphere, 25° C.

Charge-discharge conditions: 0.1 μA constant current mode, cut-off voltage 4.2 V/3 V (Resistance Measurement)

Figure 26:
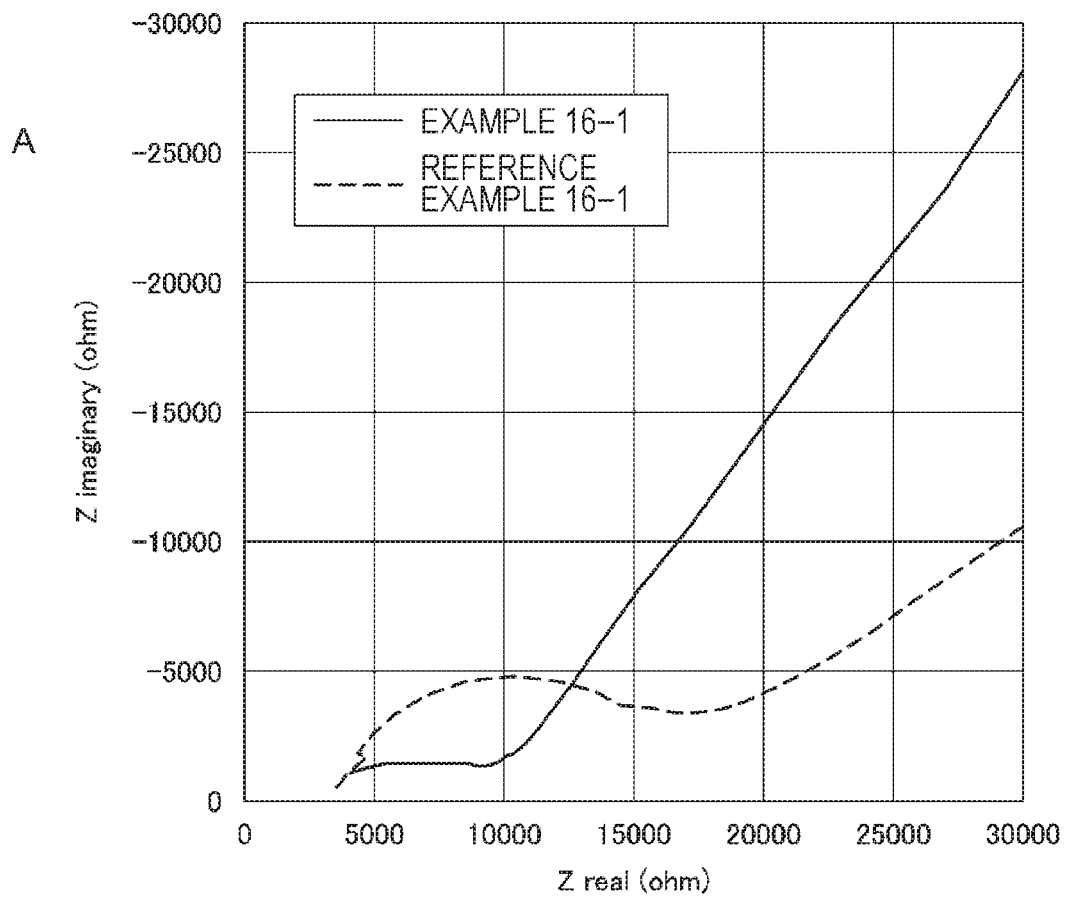
FIG. 26A is a graph showing the Cole-Cole plots of the batteries of Example 16-1 and Reference Example 16-1.
FIG. 26B is a graph showing the current characteristics of the batteries of Example 16-1 and Reference Example 16-1.
Figure 26:
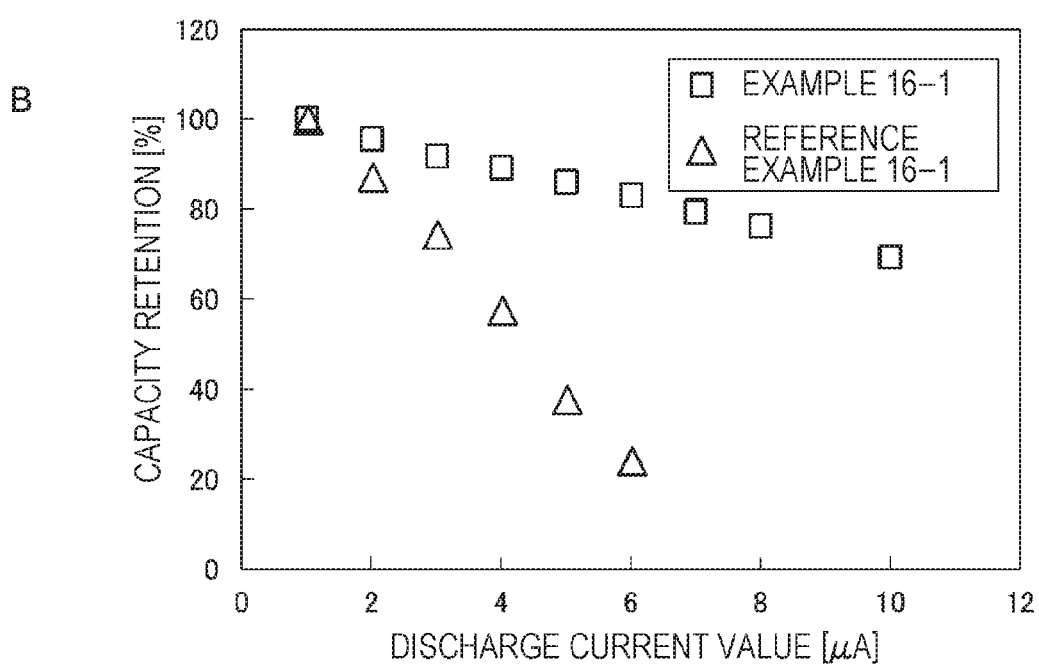

The resistance value of the battery was determined in the frequency region of $10^6$ to 1 Hz (amplitude 10 mV) using an evaluation system manufactured by Solartron Metrology. The results are shown in FIG. 26A.

(Current Characteristics)

The current characteristics were evaluated at different discharge current values in the range of 1 μA to 10 μA under 25° C. measurement environment conditions in a dry air atmosphere. The results are shown in FIG. 26B.

Table 9 shows the results of the evaluation of the samples.

TABLE 9

| | Positive electrode firing conditions | Capacity [mAh/g] Charge | Discharge | Initial charge-discharge efficiency [%] | Cycle characteristics [%] |
|---|---|---|---|---|---|
| Example 16-1 | Compression and firing at 430° C. and 70 N/mm2 (hot pressing) | 138.2 | 126.8 | 91.8 | 87.3 (50 cycle) |
| Example 16-2 | Firing at 430° C. (without hot pressing) | 132.0 | 112.5 | 85.2 | 48.7 (10 cycle) |

Figure 25:
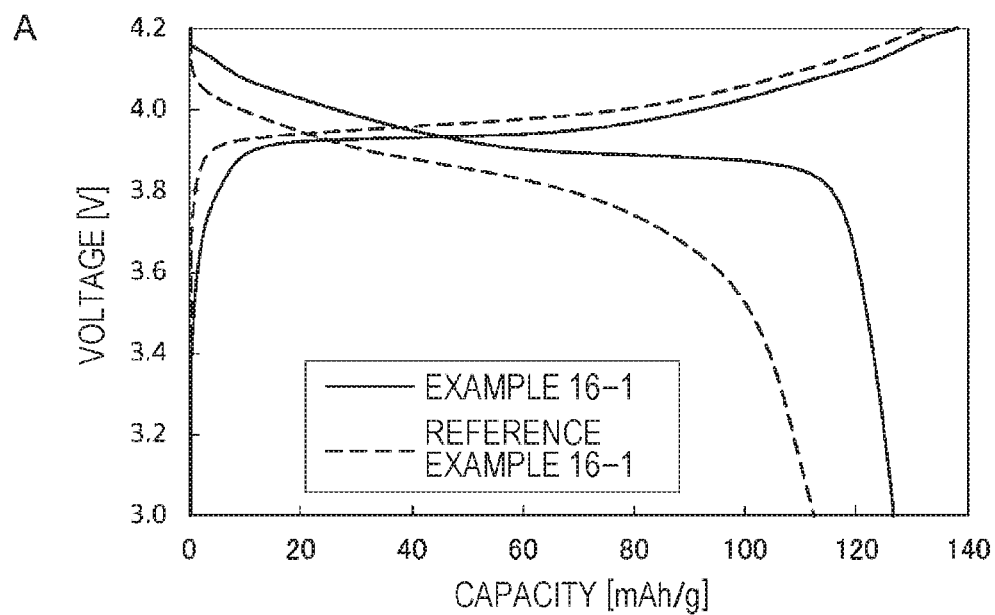
FIG. 25A is a graph showing the results of evaluation of the charge-discharge curve of the batteries of Example 16-1 and Reference Example 16-1.
FIG. 25B is a graph showing the results of evaluation of the cycle characteristics of the batteries of Example 16-1 and Reference Example 16-1.
Figure 25:
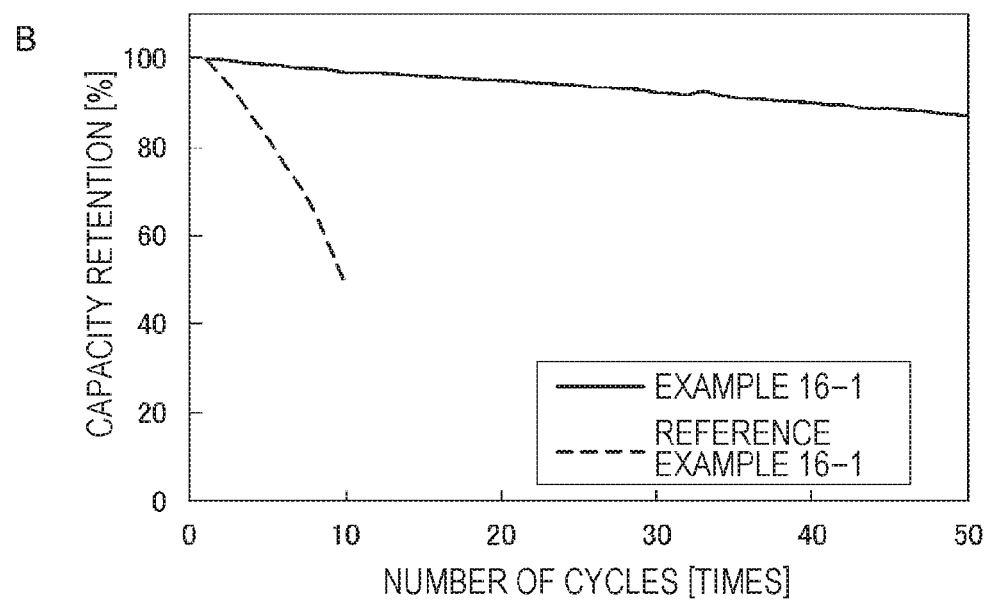

FIG. 25A shows that for the battery of Example 16-1, the resistance value is decreased (in other words, the IR-drop is suppressed), and the discharge voltage is increased.

FIG. 25B shows that the battery of Example 16-1 has significantly improved cycle characteristics.

FIG. 26A shows that the battery of Example 16-1 has a curve with a smaller circular arc. This indicates that the battery of Example 16-1 has a significantly decreased interface resistance between the active material and the electrolyte.

FIG. 26B shows that the battery of Example 16-1 has significantly improved current characteristics. This would be because of a decrease in the interface resistance and an increase in the ionic conductivity of the electrolyte.

Embodiments of the present technology and modifications thereof, and examples of the present technology have been described specifically. It will be understood that the embodiments, the modifications, and the examples described above are not intended to limit the present technology and that they may be altered or modified in various manners on the basis of the technical idea of the present technology.

For example, the configurations, methods, processes, shapes, materials, values, and other conditions shown in the embodiments, the modifications thereof, and the examples are only by way of example, and if necessary, configurations, methods, processes, shapes, materials, values, and other conditions different from the above may also be used.

In addition, the configurations, methods, processes, shapes, materials, values, and other conditions shown in the embodiments, the modifications thereof, and the examples may also be combined without departing from the gist of the present technology.

The present technology may also have the following configurations.

(1)

A glass-ceramic including an oxide containing lithium (Li), silicon (Si), and boron (B), the glass-ceramic having an X-ray diffraction spectrum with two or more peaks appearing in the range $20°\leq2\theta\leq25°$ and with two or more peaks appearing in the range $25°<2\theta\leq30°$.

(2)

The glass-ceramic according to item (1), wherein the oxide includes 69 mol % or more of an oxide of the lithium (Li), the glass-ceramic having a Raman spectrum with a peak X appearing in the Raman shift region of 920 cm$^{-1}$ to 940 cm$^{-1}$ and with a peak Y appearing in the Raman shift region of 820 cm$^{-1}$ to 850 cm$^{-1}$ and also having a ratio X/Y of the area intensity of the peak X to the area intensity of the peak Y of 2.0 or more.

(3)

The glass-ceramic according to item (1), wherein the oxide includes 50 mol % to less than 69 mol % of an oxide of the lithium (Li), the glass-ceramic having a Raman spectrum with peaks appearing in the Raman shift region of 500 cm$^{-1}$ to 1,000 cm$^{-1}$, wherein the peaks include a main peak with a full width at half maximum of 20 or more.

(4)

The glass-ceramic according to any one of items (1) to (3), which has a $^7$Li nuclear spin-lattice relaxation time of 6 seconds or less as measured by a nuclear magnetic resonance method.

(5)

The glass-ceramic according to any one of items (1) to (4), wherein the oxide includes an oxide of the lithium (Li), an oxide of the silicon (Si), and an oxide of the boron (B), the content of the oxide of the lithium (Li) is from 40 mol % to 73 mol % based on the total amount of the oxide of the lithium, the oxide of the silicon (Si), and the oxide of the boron (B), the content of the oxide of the silicon (Si) is from 8 mol % to 40 mol % based on the total amount of the oxide of the lithium, the oxide of the silicon (Si), and the oxide of the boron (B), and the content of the oxide of the boron (B) is from 10 mol % to 50 mol % based on the total amount of the oxide of the lithium, the oxide of the silicon (Si), and the oxide of the boron (B).

(6)

The glass-ceramic according to any one of items (1) to (5), wherein the oxide further contains one or more selected from the group consisting of sodium (Na), magnesium (Mg), aluminum (Al), phosphorus (P), potassium (K), calcium (Ca), titanium (Ti), vanadium (V), chromium (Cr), manganese (Mn), iron (Fe), cobalt (Co), nickel (Ni), copper (Cu), zinc (Zn), gallium (Ga), germanium (Ge), selenium (Se), rubidium (Rb), sulfur (S), yttrium (Y), zirconium (Zr), niobium (Nb), molybdenum (Mo), silver (Ag), indium (In), tin (Sn), antimony (Sb), cesium (Cs), barium (Ba), hafnium (Hf), tantalum (Ta), tungsten (W), lead (Pb), bismuth (Bi), gold (Au), lanthanum (La), neodymium (Nd), and europium (Eu).

(7)

A battery including a positive electrode, a negative electrode, and an electrolyte layer, wherein at least one of the positive electrode, the negative electrode, and the electrolyte layer contains the glass-ceramic according to any one of items (1) to (6).

(8)

An electronic device having a battery including a positive electrode, a negative electrode, and an electrolyte layer and being configured to receive power supply from the battery, wherein at least one of the positive electrode, the negative electrode, and the electrolyte layer contains the glass-ceramic according to any one of items (1) to (6).

(9)

An electrode including the glass-ceramic according to any one of items (1) to (6).

(10)

A solid electrolyte including the glass-ceramic according to any one of items (1) to (6).

(11)

A lithium ion conductor including an oxide containing lithium (Li), silicon (Si), and boron (B), the lithium ion conductor having an X-ray diffraction spectrum with two or more peaks appearing in the range 20°≤2θ≤25° and with two or more peaks appearing in the range 25°<2θ≤30°.

(12)

A lithium ion conductor including an oxide containing lithium (Li), silicon (Si), and boron (B), the lithium ion conductor having an X-ray diffraction spectrum with a peak A appearing in the range 25°≤2θ≤26° and with a peak B appearing in the range 41°≤2θ≤42°.

(13)

The lithium ion conductor according to (10), which has a ratio of the intensity of the peak A to the intensity of the peak B of 0.5 to 2.

(14)

A battery including a positive electrode, a negative electrode, and an electrolyte layer, wherein at least one of the positive electrode, the negative electrode, and the electrolyte layer contains the lithium ion conductor according to any one of items (11) to (13).

(15)

An electronic device having a battery including a positive electrode, a negative electrode, and an electrolyte layer and being configured to receive power supply from the battery, wherein at least one of the positive electrode, the negative electrode, and the electrolyte layer contains the lithium ion conductor according to any one of items (11) to (13).

(16)

An electrode including the lithium ion conductor according to any one of items (11) to (13).

(17)

A solid electrolyte including the lithium ion conductor according to any one of items (11) to (13).

(18)

A method for producing an electrode, the method including firing an electrode including an active material and a lithium ion conductor while pressurizing the electrode, wherein the lithium ion conductor includes an oxide containing lithium (Li), silicon (Si), and boron (B).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

11, 21 Positive electrode
21A Positive electrode collector
21B Positive electrode active material layer
12, 22 Negative electrode
22A Negative electrode collector
22B Negative electrode active material layer
13 Solid electrolyte layer

The invention claimed is:

1. A glass-ceramic comprising an oxide containing lithium (Li), silicon (Si), and boron (B), the glass-ceramic having an X-ray diffraction spectrum with at least two peaks appearing in the range 20°≤2θ≤25° and with at least two peaks appearing in the range 25°<2θ≤30°; wherein the oxide includes at least 69 mol % of an oxide of the lithium (Li), the glass-ceramic having a Raman spectrum with a peak X appearing in the Ranan shift region of 920 cm-1 to 940 cm-1 and with a peak Y appearing in the Raman shift region of 820 cm-1 to 850 cm-1 and also having a ratio X/Y of an area intensity of the peak X to an area intensity of the peak Y of at least 2.0.

2. The glass-ceramic according to claim 1, which has a 7Li nuclear spin-lattice relaxation time of at most 6 seconds as measured by a nuclear magnetic resonance method.

3. The glass-ceramic according claim 1, wherein the oxide comprises an oxide of the lithium (Li), an oxide of the silicon (Si), and an oxide of the boron (B), the content of the oxide of the lithium (Li) is from 69 mol % to 73 mol % based on the total amount of the oxide of the lithium, the oxide of the silicon (Si), and the oxide of the boron (B), the content of the oxide of the silicon (Si) is from 8 mol % to 40 mol % based on the total amount of the oxide of the lithium, the oxide of the silicon (Si), and the oxide of the boron (B), and the content of the oxide of the boron (B) is from 10 mol % to 50 mol % based on the total amount of the oxide of the lithium, the oxide of the silicon (Si), and the oxide of the boron (B).

4. The glass-ceramic according to claim 1, wherein the oxide further contains at least one selected from the group consisting of sodium (Na), magnesium (Mg), aluminum (Al), phosphorus (P), potassium (K), calcium (Ca), titanium (Ti), vanadium (V), chromium (Cr), manganese (Mn), iron (Fe), cobalt (Co), nickel (Ni), copper (Cu), zinc (Zn), gallium (Ga), germanium (Ge), selenium (Se), rubidium (Rb), sulfur (S), yttrium (Y), zirconium (Zr), niobium (Nb), molybdenum (Mo), silver (Ag), indium (In), tin (Sn), antimony (Sb), cesium (Cs), barium (Ba), hafnium (Hf), tantalum (Ta), tungsten (W), lead (Pb), bismuth (Bi), gold (Au), lanthanum (La), neodymium (Nd), and europium (Eu).

5. A battery comprising a positive electrode, a negative electrode, and an electrolyte layer, wherein at least one of the positive electrode, the negative electrode, and the electrolyte layer contains a glass-ceramic having an X-ray diffraction spectrum with at least two peaks appearing in the range 20°≤2θ≤25° and with at least two peaks appearing in the range 25°<2θ≤30°, wherein the glass-ceramic comprises an oxide containing lithium (Li), silicon (Si), and boron (B), and the oxide includes at least 69 mol % of an oxide of the lithium (Li), the glass-ceramic having a Raman spectrum with a peak X appearing in the Raman shift region of 920 cm-1 and with a peak Y appearing in the Raman shift region of 820 cm-1 to 850 cm-1 and also having a ration X/Y of an area intensity of the peak X to an area intensity of the peak Y of at least 2.0.

6. An electronic device having a battery comprising a positive electrode, a negative electrode, and an electrolyte layer and being configured to receive power supply from the battery, wherein at least one of the positive electrode, the negative electrode, and the electrolyte layer contains a glass-ceramic having an X-ray diffraction spectrum with at least two peaks appearing in the range 20°≤2θ≤25° and with at least two peaks appearing in the range 25°<2θ≤30°, wherein the glass-ceramic comprises an oxide containing lithium (Li), silicon (Si), and boron (B), and the oxide includes at least 69 mol % of and oxide of the lithium (Li), the glass-ceramic having a Raman spectrum with a peak X appearing in the Raman shift region of 920 cm-1 to 940 cm-1 and with a peak Y appearing in the Raman shift region of 820 cm-1 to 850 cm-1 and also having a ratio X/Y of an area intensity of the peak X to an area intensity of the peak Y of at least 2.0.

7. A lithium ion conductor comprising an oxide containing lithium (Li), silicon (Si), and boron (B), the lithium ion conductor having an X-ray diffraction spectrum with at least two peaks appearing in the range 20°≤2θ≤25° and with at least two peaks appearing in the range 25°<2θ≤30°, wherein the oxide includes at least 69 mol % of an oxide of the lithium (Li), the lithium ion conductor having a Raman spectrum with a peak X appearing in the Raman shift region of 920 cm-1 to 940 cm-1 and with a peak Y appearing in the Raman shift region of 820 cm-1 to 850 cm-1 and also having a ratio X/Y of an area intensity of the peak X to an area intensity of the peak Y of at least 2.0.

8. A lithium ion conductor comprising an oxide containing lithium (Li), silicon (Si), and boron (B), the lithium ion conductor having an X-ray diffraction spectrum with a peak A appearing in the range 25°≤2θ≤26° and with a peak B appearing in the range 41°≤2θ≤42°.

9. The lithium ion conductor according to claim 8, which has a ratio of the intensity of the peak A to the intensity of the peak B of 0.5 to 2.

10. A battery comprising a positive electrode, a negative electrode, and an electrolyte layer, wherein at least one of the positive electrode, the negative electrode, and the electrolyte layer contains a lithium ion conductor having an X-ray diffraction spectrum with a peak A appearing in the range 25°≤2θ≤26° and with a peak B appearing in the range 41°≤2θ≤42°.

11. An electronic device having a battery comprising a positive electrode, a negative electrode, and an electrolyte layer and being configured to receive power supply from the battery, wherein at least one of the positive electrode, the negative electrode, and the electrolyte layer contains a lithium ion conductor having an X-ray diffraction spectrum with a peak A appearing in the range 25°≤2θ≤26° and with a peak B appearing in the range 41°≤2θ≤42°.

12. A method for producing an electrode, the method comprising firing an electrode comprising an active material and a lithium ion conductor while pressurizing the electrode, wherein the lithium ion conductor comprises an oxide containing lithium (Li), silicon (Si), and boron (B), and the oxide includes at least 69 mol % of an oxide of the lithium (Li), the lithium ion conductor having a Raman spectrum with a peak X appearing in the Raman shift region of 920 cm-1 to 940 cm-1 and with a peak Y appearing in the Raman shift region of 820 cm-1 to 850 cm-1 and also having a ratio X/Y of an area intensity of the peak X to an area intensity of the peak Y of at least 2.0.

13. A method for producing an electrode, the method comprising firing an electrode comprising an active material and a lithium ion conductor while pressurizing the electrode, wherein the lithium ion conductor comprising an oxide containing lithium (Li), silicon (Si), and boron (B), the lithium ion conductor having an X-ray diffraction spectrum with a peak A appearing in the range 25°≤2θ≤26° and with a peak B appearing in the range 41°≤2θ≤42°.

* * * * *